United States Patent Office 3,598,786
Patented Aug. 10, 1971

3,598,786
NOVEL OLIGOMERS, NOVEL THERMALLY
STABLE POLYMERS AND METHOD OF
THEIR MANUFACTURE
Naoya Yoda, Masaru Kurihara, Shunroku Tohyama,
Kojuro Ikeda, Noriaki Dokoshi, and Ryoji Nakanishi,
Kamakura-shi, Japan, assignors to Toyo Rayon Kabushiki Kaisha, Tokyo, Japan
No Drawing. Filed Mar. 31, 1967, Ser. No. 627,290
Claims priority, application Japan, Apr. 5, 1966,
41/20,932; Apr. 9, 1966, 41/22,061; Apr. 23,
1966, 41/25,506; July 16, 1966, 41/46,180;
Aug. 9, 1966, 41/51,873; Nov. 30, 1966,
41/48,247, 41/48,248
Int. Cl. C08g 20/32
U.S. Cl. 260—47                              53 Claims

ABSTRACT OF THE DISCLOSURE

This invention concerns novel oligomers and thermally stable polymers of the novel structure produced from said oligomers and polyamines, and a method of the manufacture of these polymers and oligomers. The said thermally stable polymers have remarkably improved stability against hydrolysis and abrasive resistance over the conventionally known polyimide-type thermally stable polymers, and concurrently possess the excellent properties of the said known polymers. The oligomer may be expressed by the following Formula III:

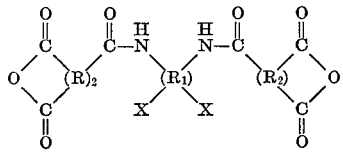

---

This invention concerns thermally stable polymers of the novel structure and novel oligomers as starting materials therefor, and a method of the manufacture of these polymers and oligomers. The said thermally stable polymers have remarkably improved stability against hydrolysis (resistance to alkalini) and abrasive resistance over the conventionally known polyimide-type thermally stable polymers, and concurrently possess the excellent properties of the said known polyimide-type polymers, such as excellent thermal stability, other mechanical properties, electrical properties and resistance to chemicals.

It has been widely known that polyimide obtained by dehydration of polyamide acid given by the reaction of tetracarboxylic dianhydride and diamine possesses excellent thermal stability and physical properties. Such polyimide because of its excellent elongation, is preferably used as enamel for electric wires, but is not satisfactory in respect of stability against hydrolysis and abrasive resistance. For this reason, polyimide is restricted much in its utilization. It is clear therefore that if the said dissatisfactory properties can be improved without deteriorating thermal stability and other desirable properties of the polyimide-type polymer, the so improved polymer is commercially very advantageous.

We have made researches with a view of achieving such improvement, and developed a novel polyimide-type polymer prepared by reacting a novel oligomer expressed by the Formula III mentioned below with at least one amine selected from the group consisting of diamine, triamine and tetramine expressed by the Formulae IV, V and VI mentioned below, in the presence or absence of tetracarboxylic acid dianhydride expressed by the Formula III' below, and heating and/or dehydrating reagents of the obtained polyamide. We have discovered that by this novel polymer, the above-mentioned improvements can be achieved.

Accordingly, the object of this invention is to provide novel thermally stable polymers by which dissatisfactory properties of the known polyimide-type polymer have been improved markedly, novel oligomers as a starting material therefor, and a method of the manufacture of the said polymer and oligomer.

Many other objects and advantages of this invention will be made clearer from the description which follows.

First of all, explanation will be directed to the novel oligomers and a method of their manufacture according to this invention.

The novel oligomer of this invention is an oligomer expressed by the following Formula III:

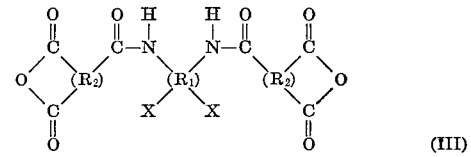

(wherein $R_1$ represents a tetravalent group having at least one 6-membered ring; X represents a group selected from the class consisting of a hydroxy group, alkoxy group, aryloxy group, mercapto group, alkylthio group, arylthio group, carboxyl group, carboxylate group, amino and halogen; the iminocarbonyl group and group X are each directly bonded to a different carbon atom of the ring of $R_1$; in the two of the iminocarbonyl group and group X combinations, these two groups are bonded to adjoining carbon atoms; $R_2$ is a trivalent group having at least one 6-membered ring, the three carbonyl groups bonded thereto each being directly bonded to a different carbon atom of the $R_2$; and two of these carbonylg roups forming an acid anhydride linkage are bonded to adjoining carbon atoms of the ring of $R_2$).

Such oligomer can be manufactured by reacting an acid halide expressed by the following Formula I:

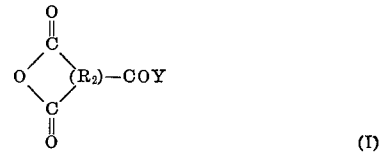

(wherein $R_2$ is a trivalent group having at least one 6-membered ring; Y is halogen; three carbonyl groups bonded to $R_2$ are each bonded directly to a different carbon atom of the ring of $R_2$; and two of these carbonyl groups forming an acid anhydride linkage are bonded to adjoining carbon atoms of the ring of $R_2$) with an amino compound of the Formula II:

(wherein $R_1$ is a tetravalent group having at least one 6-membered ring; X is a group selected from the class consisting of a hydroxyl group, alkoxy group, aryloxy group, mercapto group, alkylthio group, arylthio group, carboxyl group, carboxylate group, amino group and halogen; the amino group, and group X are directly bonded each to a different carbon atom of the ring of $R_1$, and in the two amino group and group X combinations, these two groups are bonded to adjoining carbon atoms) at low temperatures.

As $R_1$ of the Formula II, a tetravalent group having at least one 6-membered ring expressed by the following formulae:

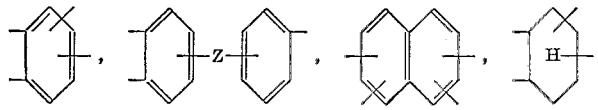

(wherein Z is a group selected from the class consisting of a carbon-to-carbon bond (of aromatic nuclei), alkylene group,

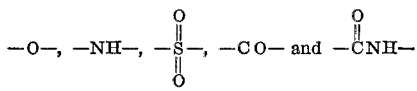

which directly binds the aromatic nuclei through itself) can be mentioned.

In the said Formula II, preferable examples of the group X are hydroxy, alkoxy having 1–3 carbon atoms, carboxyl, phenoxy, amino, alkoxycarbonyl having 1–3 carbon atoms, phenoxycarbonyl, mercapto and alkylthio having 1–3 carbon atoms.

Of course, two amino groups shown in Formula II and group X are each directly bonded to a different carbon atom of those which constitute the said at least one 6-membered ring of $R_1$, and in each of the two amino group and group X combinations, these two groups are bonded to adjacent carbon atoms.

Specific examples of the compound of the Formula II are 1,4-dihydroxy-2,5-diaminobenzene,
3,3′-dihydroxybenzidine,
3,4′-dihydroxy-4,3′-diaminobiphenyl,
3,3′-diamino-4,4′-dihydroxydiphenylether,
iminocarbonylbis(3-amino-4-hydroxybenzene),
carbonylbis(3-amino-4-hydroxybenzene),
methylenebis(3-hydroxy-4-aminobenzene),
1,4-dihydroxy-2,5-diaminocyclohexane,
1,4-dimercapto-2,5-diaminobenzene,
3,3′-dimercaptobenzidine,
3,3′-diamino-4,4′-di(ethylthio)diphenyl,
3,3′-(eimethoxycarbonyl)benzidine,
3,3′-diamino-4,4′-dicarboxy diphenylether,
3,3′-dimethoxybenzidine,
1,2,4,5-tetraaminobenzene,
3,3′,4,4′-tetraaminodiphenylether, and
3,3′-diamino-4,4′-dihydroxydiphenylsulfide.

As the acid halide of Formula I, those in which $R_2$ is a trivalent group having at least one 6-membered ring of the following formulae:

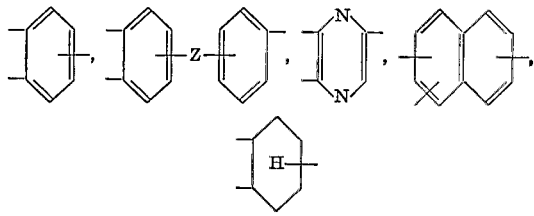

(wherein Z is a group selected from the class consisting of a carbon-to-carbon bond (of aromatic nuclei), alkylene group, —O—, —NH—, —S—, —CO—,

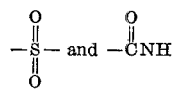

which directly binds the aromatic nuclei through itself) can be preferably cited.

Examples of Y in Formula I are chlorine, bromine and iodine.

Specific examples of the compound represented by Formula I are trimellitic acid monohalide anhydride and monocarboxylic acid halides of tricarboxylic acid anhydride such as 2,3,6-naphthalenetricarboxylic acid anhydride,
3,4,4′-diphenylethertricarboxylic acid anhydride,
2,2′,3-biphenyltricarboxylic acid anhydride,
2-(3,4-dicarboxyphenyl)-2-(3-carboxyphenyl)propane anhydride,
1,2,4-naphthalenetricarboxylic acid anhydride,
1,4,5-naphthalenetricarboxylic acid anhydride,
2,3,5-pyrazinetricarboxylic acid anhydride,
2-(2,3-dicarboxyphenyl)-2-(3-carboxyphenyl)propane anhydride,
1-(2,3-dicarboxyphenyl)-1-(3-carboxyphenyl)ethane anhydride,
1-(3,4-dicarboxyphenyl)-1-(4-carboxyphenyl)ethane anhydride,
(2,3-dicarboxyphenyl)(2-carboxyphenyl)methane anhydride,
1,2,3-benzenetricarboxylic acid anhydride, and
3,3′,4-tricarboxybenzophenone anhydride (the haloformyl group in these examples is attached to a non-adjacent carbon atom of the carbonyl group constituting the acid anhydride).

The novel oligomer expressed by Formula III in this invention can be obtained by the reaction of the acid halide of Formula I with the amino compound of Formula II at low temperatures. The reaction proceeds by contacting them with each other, and the subsequent dehalogenohydrogenation will give an oligomer of Formula III.

The mole ratio of the amino compound of Formula II to the acid halide of Formula I is 1 mole of about 2 moles. Of course, 10 mole percent, smaller or greater than this, of the acid halide per mole of the amino compound can be used.

The reaction is carried out by employing the lowest possible temperature such that the group X of the compound of Formula II may not participate in the reaction. Although the temperature depends upon the type of the compound of Formulae I and II and the type of the group X, the preferable temperature is ordinarily not higher than 30° C. If the reaction temperature is too high, the group X some times participates in the reaction, and consequently it becomes difficult to obtain the oligomer of Formula III in high yields. Preferably, the temperature at 15 to —70° C., especially 10 to —50° C. may be used.

It is preferable that the reaction is usually carried out by using as a reaction medium a solvent inert to the compounds of Formulae I and II under the reaction conditions, above all, organic inert solvents. Preferable organic solvents are those which dissolve at least one of the compound of Formula I and the compound of Formula II. Specific examples of such solvents are 1,1,2-trichloroethylene, dimethylformamide, dimethylacetamide, N-methyl-2-pyrrolidone and N-methyl-ε-caprolactam, and dimethyl sulfoxide, tetramethyl urea, pyridine, dimethyl sulfone, hexamethyl phosphonamide, N-methylformamide, butyrolactone and N-acetyl-2-pyrrolidone are likewise used. It is possible to use these solvents either alone or in combination, and benzene, toluene, nitrobenzene, dioxane and cyclohexanone can be added.

On the other hand, an inorganic salt can be added in order to increase the solubility of the aligomer of Formula III and to maintain the reaction system homogeneous. Such an inorganic salt includes, for instance, lithium chloride, calcium chloride, magnesium carbonate and zinc chloride.

According to the procedure mentioned above, the novel oligomer of Formula III is obtained. A novel polyimide-type thermally stable polymer can be obtained by reacting this oligomer with at least one amine selected from the class consisting of diamine, triamine and tetramine expressed respectively by the following Formulae IV, V, and IV:

$$H_2N—R_3—NH_2 \qquad (IV)$$

(wherein $R_3$ is a divalent group having at least two carbon atoms, and the two amino groups are each bonded to a different carbon atom)

(V)

(wherein $R_4$ is a trivalent group having at least 3 carbon atoms, and the three amino groups are each bonded to a different carbon atom, two of the said amino groups being bonded to adjacent carbon atoms)

(VI)

(wherein $R_5$ is a tetravalent group having at least 4 carbon atoms, the four amino group are each bonded to a different carbon atom, and in each of the two amino group combinations, the said two amino groups are bonded to adjacent carbon atoms) to thereby form polyimide having group X and carboxyl in the molecule, and thereafter subjecting the said polyamide to a ring-closing treatment at a temperature not lower than 50° C.

As the diamine of Formula IV, those in which $R_3$ is a divalent bonezenoid group expressed by

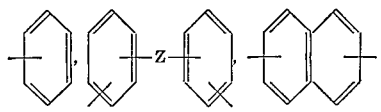

(wherein Z represents a group selected from the class consisting of a carbon-to-carbon bond (of aromatic nuclei), alkylene group, —O—, —NH—,

—CO—, —S— and

which directly binds the aromatic nuclei through itself) are preferable.

As the triamine of the said Formula V, those in which $R_4$ is a trivalent benzenoid group expressed by any of the following formulae:

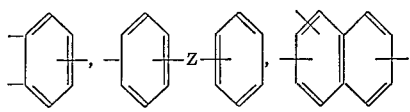

(wherein Z is the same as defined with respect to the said $R_3$) are preferable.

As the tetramine of the said Formula VI, those in which $R_5$ is a tetravalent benzenoid group expressed by any of the following formulae:

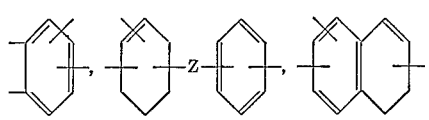

(wherein Z is the same as defined with respect to the said $R_3$) are preferable.

Specific examples of the diamine of Formula IV are m-phenylene diamine, p-phenylene diamine, 2,2-bis(p-aminophenyl)propane, 1,1 - bis(p - aminophenyl)ethane, 4,4′ - diaminodiphenyl methane, benzidine, 4,4′-diaminodiphenylsulfide, 4,4′-diaminodiphenyl sulfone, 3,3′-diaminodiphenyl sulfone, p-bis(4-aminophenoxy)benzene, 4, 4′-diaminodiphenyl ether, 1,5 - diaminonaphthalene, 3,3′-dimethyl - 4,4′ - diaminobiphenyl, 3,4-diaminobenzanilide, 4-(p-aminophenoxy) - 4′-aminobenzamilide, 3,4′-diaminodiphenyl ether, 2,4 - bis(2-amino-1,1-dimethyl ethyl)toluene, 4,4′ - bis(2-amino-1,1-dimethylethyl) diphenyl ether, m-xylylenediamine, p-xylylenediamine, bis(4-aminocyclohexyl) methane, 1,4-diaminocyclohexane and mixtures of these.

As the triamine of the Formula V, there may be mentioned, for instance, 1,2,4-triaminobenzene, 3-aminobenzidine, 3,4,4′-triaminodiphenyl sulfide, 3,4,4′-triaminodiphenyl ether, 1,2,5 - triaminoanaphthalene, 1,2,4 - triaminocyclohexane, and 3,4,4′-triaminodiphenyl methane.

Specific examples of the tetramine of Formula VI are 1,2,4,5-tetraminobenzene, 3,3′-diaminobenzidine, 3,3′-(4, 4′-tetraminodiphenyl ether, 3,3′,4,4′ - tetraminodiphenyl sulfide, 3,3′,4,4′ - tetraminodiphenyl methane, 1,2,5,6-tetraminonaphthalene and 1,2,4,5-tetraminocyclohenane.

When amines are used singly or in combination for reaction with the oligomer of Formula III it is preferably to conjointly use diamine and polyamine selected from the group consisting of triamine and tetramine. At this time, the polyamine and diamine should be used in a molar ratio in the range of 5:95 to 95:5, preferably 7:93 to 50:50.

In accordance with this invention, the reaction of at least one of these amines with the oligomer of Formula III can be carried out in the presence of tetracarboxylic acid dianhydride expressed by Formula III′:

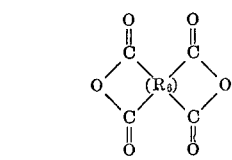
(III′)

(wherein $R_6$ represents a tetravalent benzenoid group) which replaces not more than 70 mole percent of the said oligomer of Formula III.

In the compound of the said Formula III′, four carbonyl groups are each bonded to a different carbon atom of $R_6$, and in each of the two carbonyl group combinations, the two carbonyl groups are bonded to adjacent carbon atoms. As such tetracarboxylic acid dianhydride, pyromellitic acid dianhydride is preferable. Other specific examples of the compound of Formula III′ are 2,3,6,7-naphthalenetetracarboxylic acid dianhydride,
3,3′,4,4′-tetracarboxybiphenyl dianhydride,
2,2-bis(3,4-dicarboxyphenyl) propane dianhydride,
naphthalene-1,2,4,5-tetracarboxylic acid dianhydride,
naphthalene-1,4,5,8-tetracarboxylic acid dianhydride,
pyradine-2,3,5,6-tetracarboxylic acid dianhydride,
2,2-bis(2,3-dicarboxyphenyl) propane dianhydride,
1,1-bis(2,3-dicarboxyphenyl) ethane dianhydride,
1,1-bis(3,4-dicarboxyphenyl) ethane dianhydride,
bis(2,3-dicarboxyphenyl) methane dianhydride,
benzene-1,2,3,4-tetracarboxylic acid dianhydride,
3,4,3′,4-tetracarboxybenzophenone dianhydride,
and mixtures of these.

The oligomer of Formula III used in the reaction of forming the polyamide (including not more than 70 mole percent, based on the said oligomer of Formula III, of the compound of Formula III′ when it is used) and the said amine should preferably be used in equimolar amounts. If it is desired, an excess of about 10 mole percent may be used. The manufacture of this polyamide is usually achieved by solution polymerization. The solvents to be used in the polymerization are preferably those which do not react with the said amines and the oligomers, and which dissolve at least one of these reactants.

As such solvent, there can be mentioned dimethylformamide, dimethyl acetamide, diethylacetamide, N-methyl-2-pyrrolidone, N,N′-dialkylcarboxy sulfoxide such as N-methylcaprolactam, tetramethylurea, pyridine, dimethyl sulfone, hexamethyl phosphoramide, tetramethylene sulphone, formamide, N-methylformamide, butyrolactone, and N-acetyl-2-pyrrolidone. These are used either singly or in combination. It is also possible to add benzene, toluene, nitrobenzene, chlorobenzene, dioxane, or cyclohexanone.

With a view to preventing the formed polymer from decreasing in viscosity by hydrolysis during polymerization, the solvent is used in the anhydrous state as much as possible, and this brings about better results. But a substantial presence of a small amount of water is permissible.

The organic solvent should be in an amount sufficient to dissolve the reactants. Usually, the solvent is used in such amounts that the reactants are contained in an amount of 0.05% by weight to 50% by weight. The reaction product system wherein the compound of Formula III is formed may be utilized directly for the formation of polyamide without particularly separating the compound of Formula III.

The reaction temperature is not particularly restricted so long as it is sufficient for inducing the polymerisation. Usually, it is advantageous to use a temperature of −60 to 130° C. at which at least 50% of the formed polymer is maintained as a polyamide whose ring is not closed. Preferably, it is −60 to 60° C.

It will be understood from the above description that in the polyamide forming process of this invention, the polyamide forming reaction based on the hitherto known reaction between acid dianhydride and amines takes place, and group X in the molecule of the oligomer shown by Formula III and one amino group connected to adjacent carbon atoms in the amine molecule (one group in triamine and two groups in tetramine) remain and do not participate in the reaction.

From the so obtained polyamide solution, polyamide can, if desired, be separated by the use of a non-solvent for polyamide, such as cyclohexanone, benzene, methanol, and dioxane. The viscosity values mentioned in examples were measured with the use of the so separated and dried polyamide unless otherwise specified. This polyamide solution can be used as film, material for electric insulating enamel and other enamel, and exhibits excellent chemical, thermal, mechanical, and electrical properties.

The structural unit of the polyamide main chain may be made up only by the amide linkage, or may contain a partially dehydrated and ring closed structure.

Usually, this polyamide solution or a polyamide solution obtained by replacing the solvent of the said solution by other solvent can be converted to a polymer consisting of mainly imide structure and other hetero ring structure by carrying out fabrication or processing operation, removing the solvent optionally, and dehydrating it to thereby effect ring-closing in the molecule. By this conversion, far more preferable properties come into existence.

The ring-closing of polyamide by dehydration reaction can be effected according to the ordinary intramolecular dehydration method. In other words, heating treatment or treatment with a dehydrating agent can optionally be used.

The temperature for heat-treatment is usually not lower than 50° C., preferably 200 to 400° C.

As the dehydrating agent, mixtures of a basic substance such as pyridine and quinoline with a carboxylic anhydride such as acetic anhydride, propionic anhydride and benzoic anhydride are preferably used.

One embodiment of such a dehydrating reaction is as follows. A polyamide solution obtained by the polymerization reaction is poured onto a glass plate, and dried in an atmosphere of an inert gas or under reduced pressure at a temperature necessary for removal of the solvent, for instance 50 to 300° C. for about twenty seconds to several hours. The so obtained polyamide film is light yellow. When this film is thermally and/or chemically treated to effect ring-closing, the film turns yellow. In the formation of film, a semi-cured film from which a greater part of the solvent is removed may be chemically treated, and then completely cured. In the same manner, it is possible to form a coating having a good thermal stability and electric insulation on a metal and other substance.

In novel thermally stable polymer obtained by this invention has a very excellent thermal stability, resistance to oxidation and other physical properties, and can be used as electric insulating materials and shaping materials. It is particularly advantageously used as enamel and varnishes for electric wires feasible at high temperatures, and also as film, shaped articles, laminated articles, paints, adhesives.

In the second step of the present invention (ring-closing treatment) (dehydration reaction, partially containing alcohol elimination), the following ring closing reaction is induced in addition to the hitherto known imidization, and this is inseparably related to the effects of this invention. Namely, in the oligomer shown by the general Formula III, when X is a hydroxy, alkoxy, aryloxy or halogen, benzoxazole ring is formed; when X is a carboxyl or carboxylate, a benzoxadinone ring is formed; when X is amino, a benzimidazole ring is formed; and when X is mercapto, alkylthio, or arylthio, a benzothiazole ring is formed. As a result of having such hetero rings, the polymer becomes a thermally stable polymer having the already-mentioned improved properties.

Some examples of the formation of polyamide by reaction of the oligomer of Formula III (including the conjoint use of the compound of the Formula III') with the amine of the Formula IV to VI and of the ring-closing reaction by heating and/or dehydrating treatment are given below.

(A) With respect to the case where X is hydroxy, alkoxy, aryloxy or halogen, an example is taken of X being —OH:

A—(i)

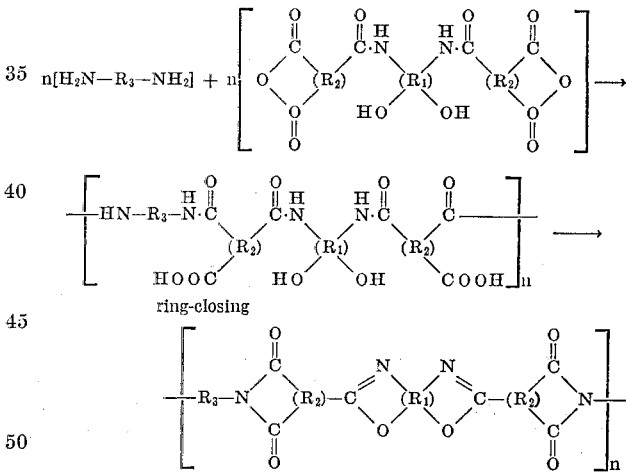

A—(ii)

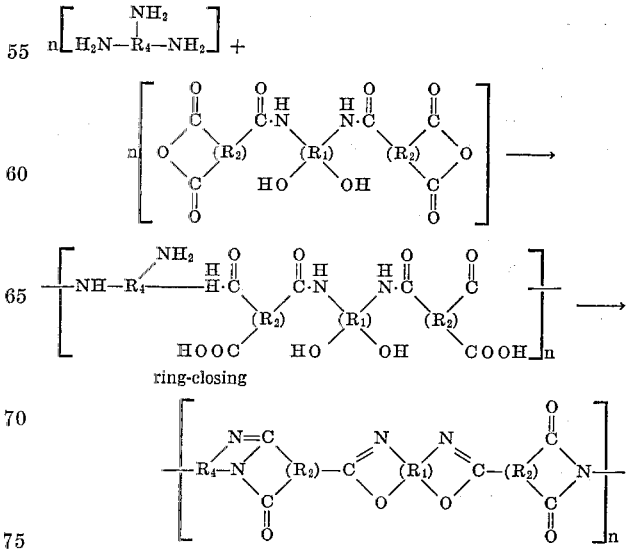

A–(iii)

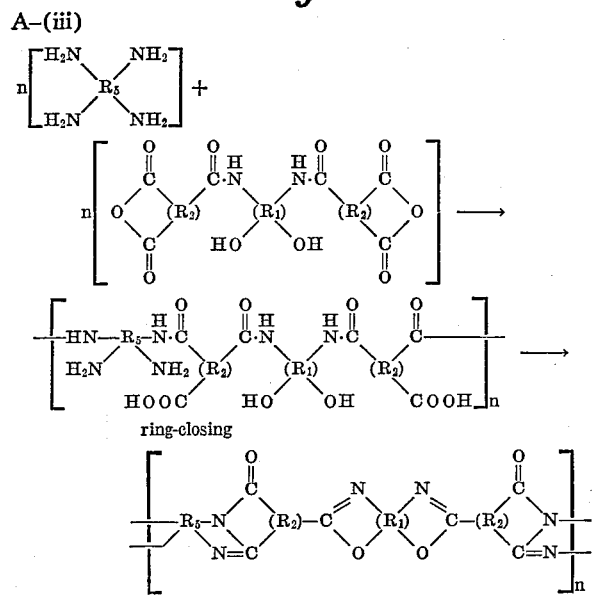

Hence, the thermally stable polymer formed by the above reactions can be expressed by the following structural Formula A:

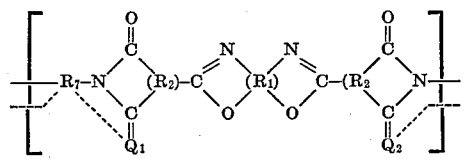

(wherein $R_1$ and $R_2$ are as defined in Formula III; $R_7$ is a group selected from the class same as those described with respect to $R_3$ of Formula IV, $R_4$ of Formula V and $R_5$ of Formula VI; when $R_7$ and $R_3$ are the same, $Q_1$ and $Q_2$ are both oxygen; when $R_7$ is the same as $R_4$, $Q_1$ is a nitrogen atom and $Q_2$ is an oxygen atom, $R_7$ being bonded also to $Q_1$; and when $R_7$ and $R_5$ are the same, $Q_1$ and $Q_2$ are both nitrogen, $R_7$ being bonded to $Q_1$ and $Q_2$). In Formula A, a case where both $Q_1$ and $Q_2$ are both oxygen is preferable.

(B) With respect to a case where X is carboxyl or carboxylate, an example is taken of X being —COOH:

B–(i)

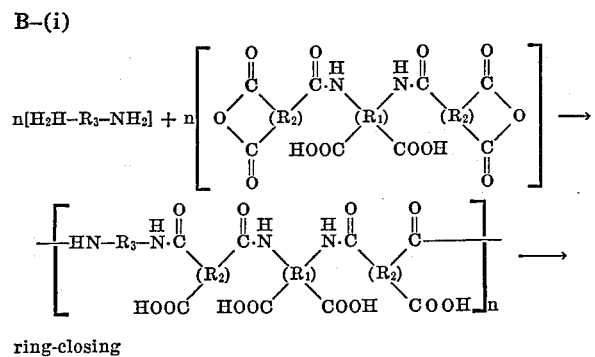

ring-closing

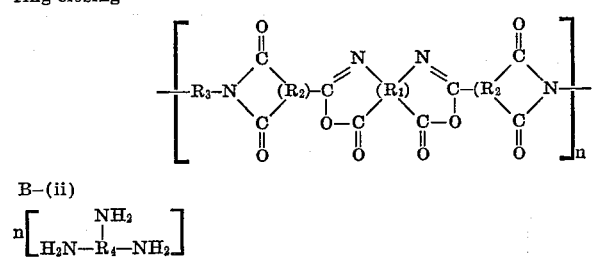

B–(ii)

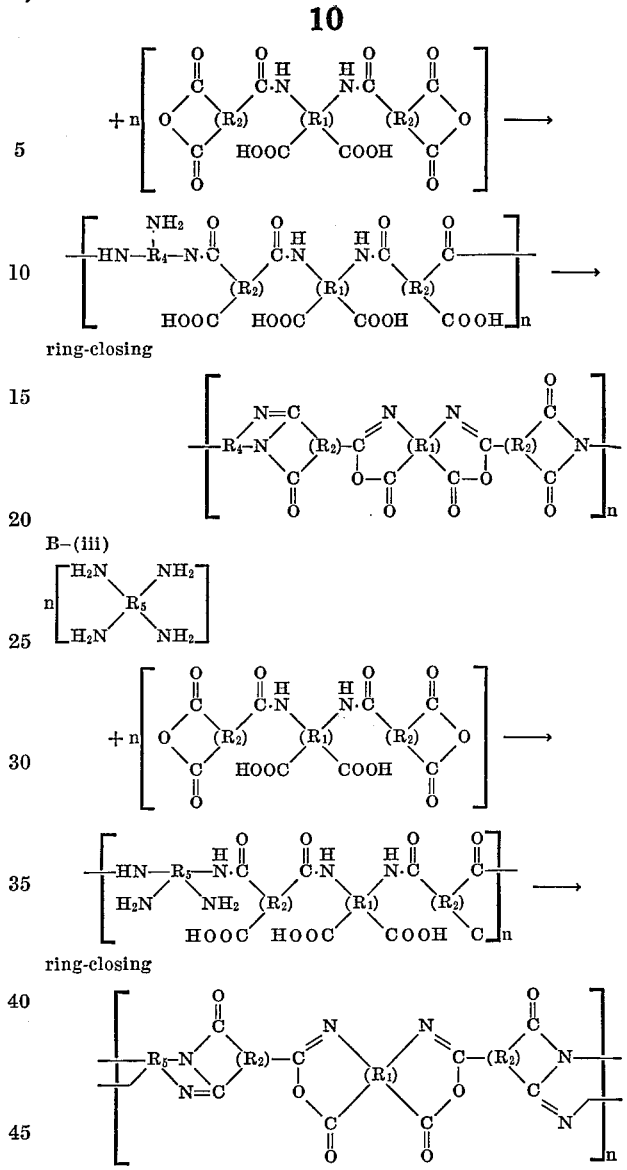

ring-closing

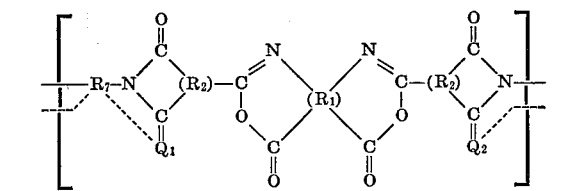

Hence, the thermally stable polymers formed by the above reactions can be expressed by the following structural Formula B:

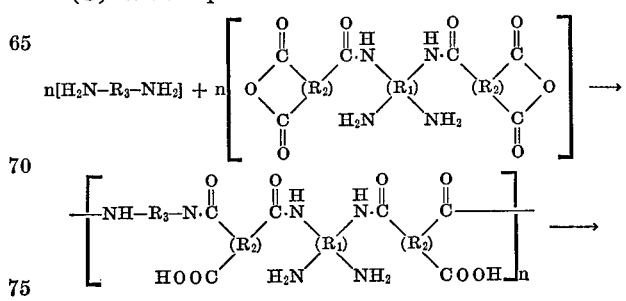

(wherein $R_1$, $R_2$, $R_7$, $Q_1$ and $Q_2$ are the same as defined with respect to Formula A).

In the above Formula B, a case where both $Q_1$ and $Q_2$ are an oxygen atom is preferable.

(C) With respect to a case where X is amino:

ring-closing

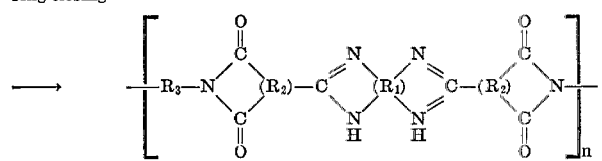

C-(ii)

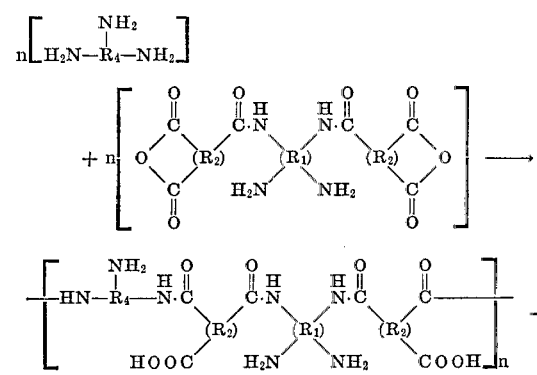

ring-closing

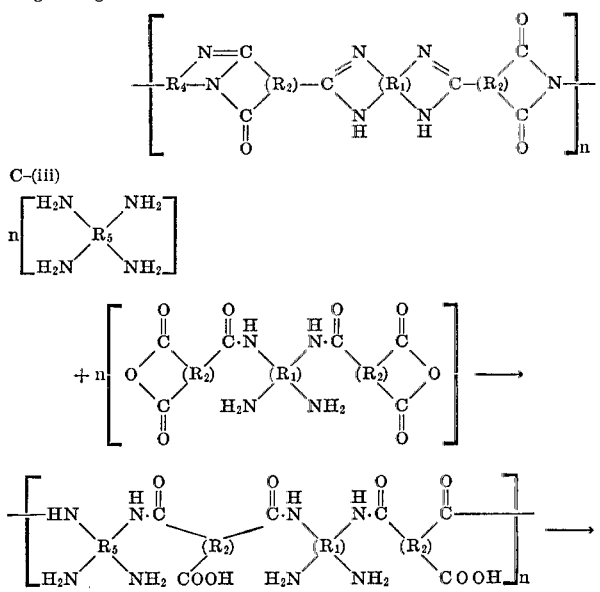

C-(iii)

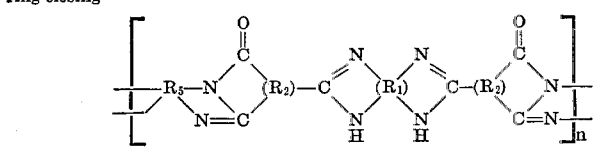

ring-closing

Hence, the thermally stable polymer is expressed by the following structural Formula C:

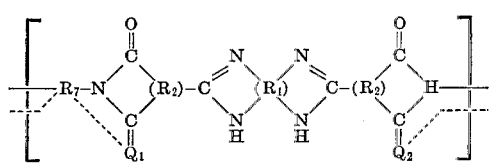

(wherein $R_1$, $R_2$, $R_7$, $Q_1$ and $Q_2$ are the same as defined with respect to said Formula A.

(D) With respect to the case where X is mercapto, alkylthio, or arylthio, the example is taken of X being —SH:

D-(i)

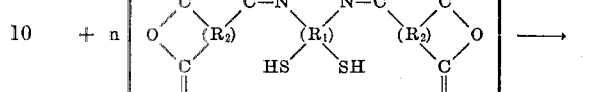

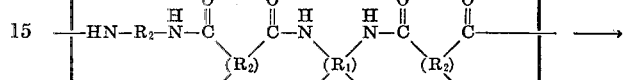

ring-closing

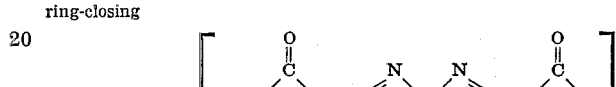

D-(ii)

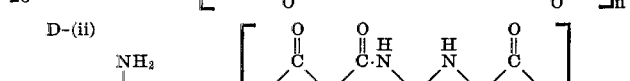

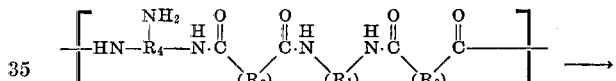

ring-closing

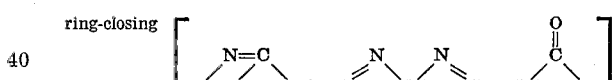

D-(iii)

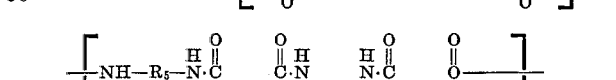

ring-closing

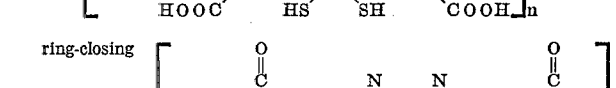

Hence, the thermally stable polymer formed by the above reactions is expressed by the following structural formula D:

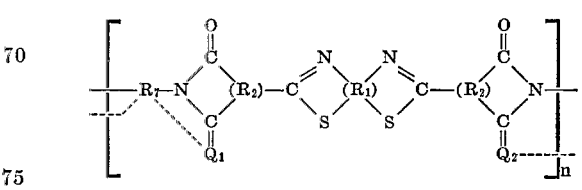

wherein $R_1$, $R_2$, $R_7$, $Q_1$ and $Q_2$ are the same as defined with respect to Formula A.

In the Formula D, a case where $Q_1$ and $Q_2$ are both an oxygen atom is preferable.

(E) We have already stated that in this invention, the reaction may be carried out in the copresence of tetracarboxylic acid dianhydride of Formula III' which replaces not more than 70 mole percent of the oligomer of Formula III. This reaction gives a copolymer of the polyimide of the said (A) to (D) already mentioned with the known polyimide prepared from tetracarboxylic acid dianhydride and amine. Several examples are given below with respect to each one example of the said (A) to (D).

(A') When the tetracarboxylic acid dianhydride of (III') is present in the A–(i) system:

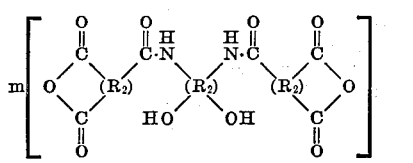

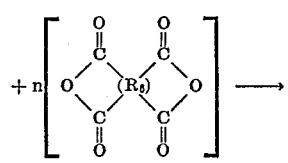

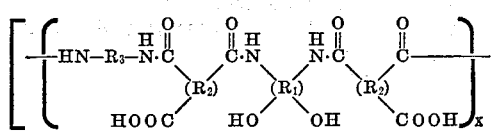

(x + y = m + n)

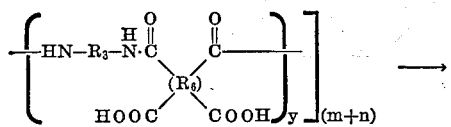

ring closing

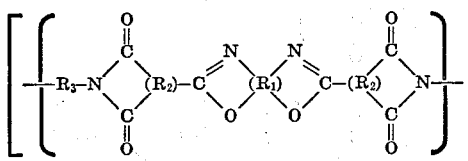

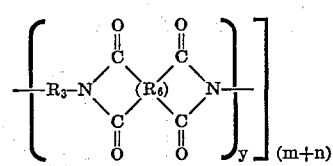

Accordingly, if it is also taken into consideration that the said tetracarboxylic acid dianhydride is present in other systems belonging to (A) above, the formed thermally stable polymer can be expressed by the following structural Formula A':

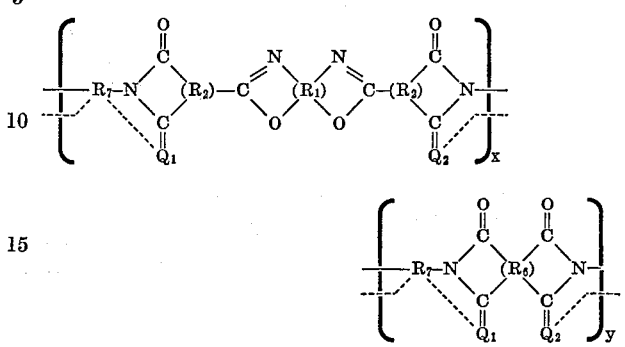

(wherein $R_1$ and $R_2$ are the same as defined with respect to Formula III; $R_6$ are the same as defined with respect to Formula III'; $R_7$ is a group selected from the class same as those described with respect to $R_3$ of Formula IV', $R_4$ of Formula V and $R_5$ of Formula VI; when $R_7$ is the same as $R_3$, $Q_1$ and $Q_2$ are both an oxygen atom; when $R_7$ is the same $R_4$, $Q_1$ is a nitrogen atom and $Q_2$ is an oxygen atom, $R_7$ being also bonded to $Q_1$; when $R_7$ is the same as $R_5$, both $Q_1$ and $Q_2$ are a nitrogen atom, $R_7$ being bonded both to $Q_1$ and $Q_2$; and both $x$ and $y$ are positive integers).

(B') When the tetracarboxylic acid dianhydride is present in the B–(i) system:

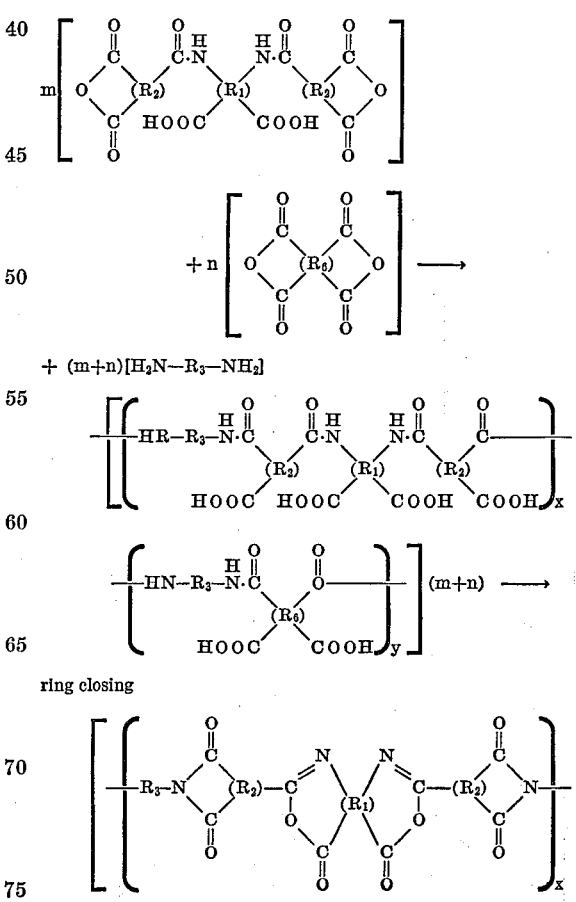

ring closing ring-closing

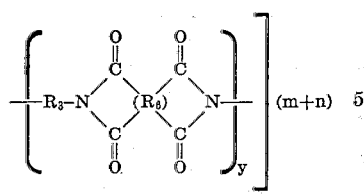 (m+n)

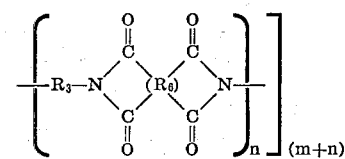 (m+n)

Accordingly, if it is also taken into consideration that the said tetracarboxylic acid dianhydride is present in other systems of (B), the formed thermally stable polymer can be expressed by the following structural Formula B':

Accordingly, if it is also taken into consideration that the said tetracarboxylic acid dianhydride is present in other system of (C), the formed thermally stable polymer can be expressed by the following structural Formula C':

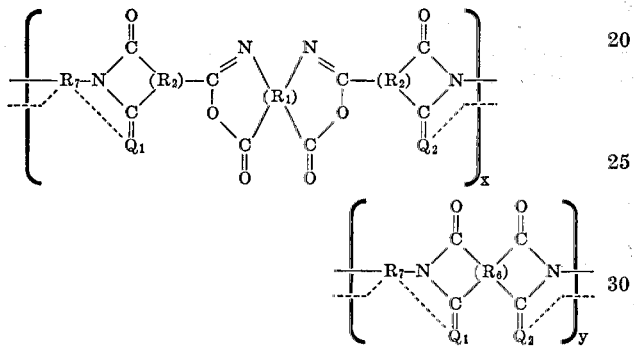

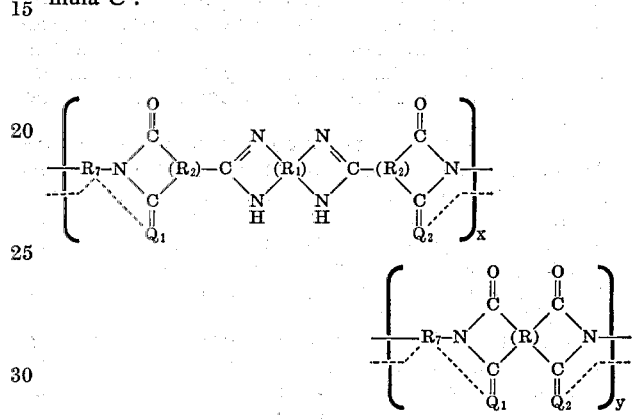

(wherein $R_1$, $R_2$, $R_6$, $R_7$, $Q_1$, $Q_2$, $x$, and $y$ are the same as defined with respect to the said Formula A').

(C') When the tetracarboxylic acid dianhydride of Formula III' is present in the C–(i) system:

(wherein $R_1$, $R_2$, $R_6$, $R_7$, $Q_1$, $Q_2$, $x$ and $y$ are the same as defined with respect to Formula A').

(D') When the said tetracarboxylic acid dianhydride is present in the D–(i) system:

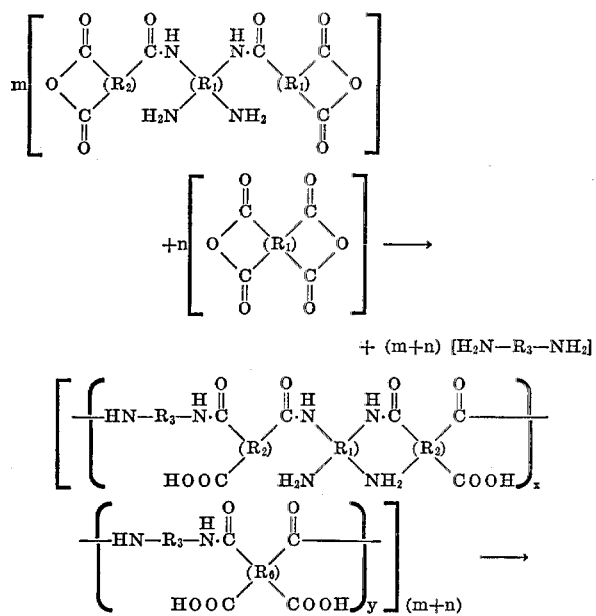

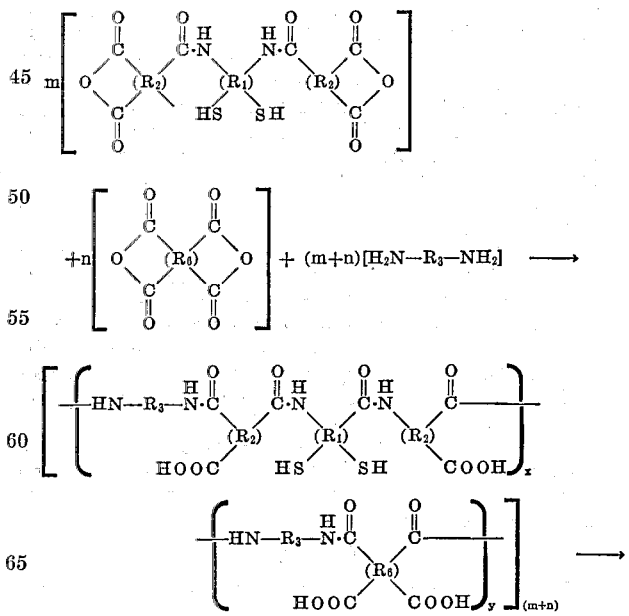

ring-closing

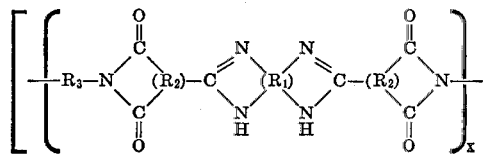

ring-closing

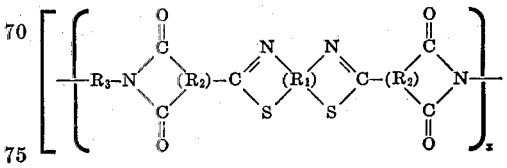

ring-closing

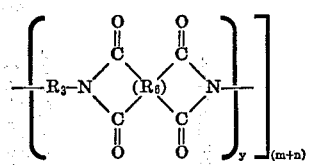

Accordingly, if it is also taken into consideration that the said tetracarboxylic acid dianhydride is present in other systems of (D), the formed thermally stable polymer can be expressed by the following structural Formula D':

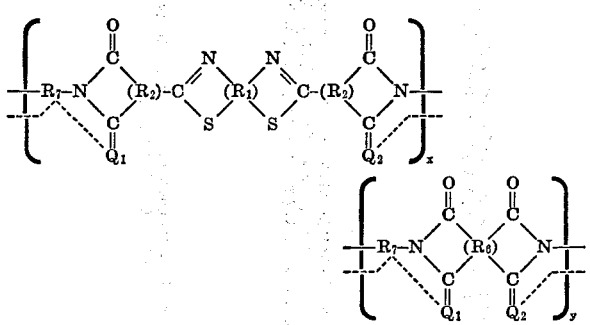

(wherein $R_1$, $R_2$, $R_6$, $R_7$, $Q_1$, $Q_2$, $x$ and $y$ are the same as defined with respect to the said Formula A').

The preferable novel oligomers of this invention are as follows:

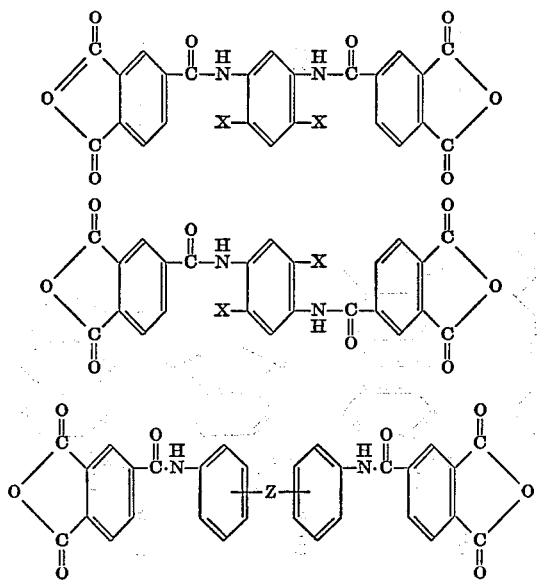

Now, the invention will be described by way of examples.

MONOMER SYNTHESES

Example A-1

To a nitrogen-blanketed vessel is added a 52.6 g. portion of 4-chloroformyl phthalic anhydride in 130 ml. of N-methylpyrrolidone at room temperature. The reaction vessel is cooled at —40° C. and 170 ml. of N-methylpyrrolidone solution containing 21.6 g. of 3,3'-dihydroxybenzidene is added dropwise to the reaction vessel with mechanical stirring over a period of 30 minutes. After the reaction is continued for 3 hours, the solution is poured into 1500 ml. of dry benzene with cooling to afford a yellow crystalline product. After washing several times with warm and cold benzene successively, it is recrystallized from acetic anhydride and vacuum dried for 6 hours to obtain a dry crystalline product at a yield of 98% (56.4 g.). The product is identified as 4,4'-[(3,3'-dihydroxy - 4,4'-biphenylylene)bis(iminocarbonyl)]diphthalic anhydride (I) based on elemental analyses, infrared spectra and melting points.

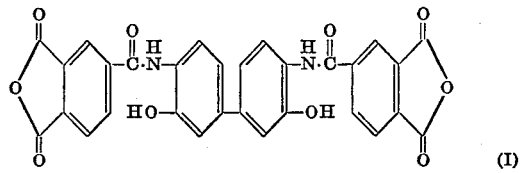

Calcd. for $C_{24}H_{16}O_{10}N_2$ (percent): C, 63.83; H, 2.86; N, 4.96. Found (percent): C, 63.62; H, 3.04; N, 4.92. IR: $\nu_{-OH}$=3420 cm.$^{-1}$, $\nu_{C=O}$=1785 cm.$^{-1}$, 1855 cm.$^{-1}$.

Melting point above 300° C.

The tetracarboxylic anhydride thus obtained is polymerized with benzidine to afford a thermally stable resin which has no melting point below 550° C. as described in Example B-1.

Example A-2

A 10.52 g. portion of 4-chloroformyl phthalic anhydride is dissolved into 30 ml. of N-methylpyrrolidone in a nitrogen-blanketed vessel with vigorous mechanical stirring, and to this solution is added dropwise a 6.8 g. portion of 3,3'-benzidinedicarboxylic acid dissolved into 30 ml. of N-methylpyrrolidone at —30° C. over a period of 30 minutes and the stirring is continued for 2 hours. The reaction product thus obtained is added to 300 ml. of trichloroethylene to afford a yellow crystalline product. It is washed thoroughly with warm trichloroethylene and recrystallized from acetic anhydride to afford 4,4'-[3,3'-hydroxycarbonyl) - 4,4' - biphenylylene]bis(iminocarbonyl]diphthalic anhydride in 97% yield (14.8 g.). The structure is confirmed by elemental analyses and infrared spectra. The tetracarboxylic acid anhydride thus obtained is found to be useful as a crosslinking agent for polyester resin.

Example A-3

To the N-methylpyrrolidone solution (60 ml.) containing 21.05 g. of 4-chloroformyl phthalic anhydride is added with vigorous mechanical stirring at —36° C. a 15.8 g. portion of methyl 4,4'-diaminodiphenylether-3,3'-dicarboxylate dissolved in 60 ml. of N-methylpyrrolidone and the stirring is continued for 2 hours at —36° C. After the reaction is completed, 600 ml. of dry toluene is added to obtain a crystalline product. The precipitate is filtered, washed thoroughly with 100 ml. of dry toluene and recrystallized from acetic anhydride. After vigorous vacuum drying, 4,4'-[oxybis[(4-methoxycarbonyl)-m-phenylene)iminocarbonyl]] diphthalic anhydride is obtained at a yield of 98.4% (32.7 g.). The structure (II) is confirmed by elemental analyses and infrared absorption spectra.

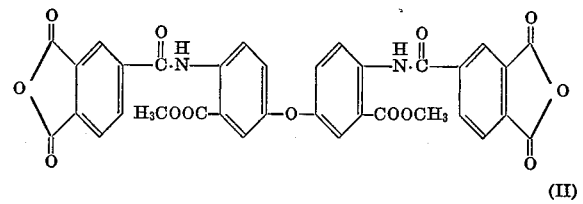

Examples A-4—A-32

A variety of new tetracarboxylic acid anhydrides are prepared in the same procedure described in Example A-1 and are summarized in Table 1 below.

TABLE 1

| Example | Reactants | | Reaction medium | Product (oligomer or monomer adduct) IR; elemental analysis (percent); M.P. (°C.); yield (percent) |
|---|---|---|---|---|
| | Diamino-component (g.) | Dianhydride-monoacid-halide (g.) | | |
| A-4 | 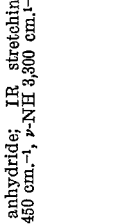 | 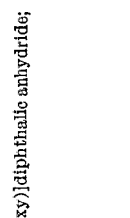 (28.5) | DMAc (100) | 4,4'-[(2,5-dihydroxy-o-phenylene)bis(iminocarbonyl)] diphthalic anhydride; IR stretching vibration of carbonyl group at 1,785 cm.⁻¹, 1,855 cm.⁻¹, ν-OH 3,450 cm.⁻¹, ν-NH 3,300 cm.⁻¹, amide carbonyl 1,655 cm.⁻¹; M.P. above 300° C.; 98%. |
| A-5 | 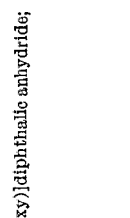 | Same as above (28.5) | DMAc (100) | 4,4'-[(2,4-dihydroxy-p-phenylene)bis(iminocarbonyl)]diphthalic anhydride; N percent (calcd. 5.73, found 5.72); 98%. |
| A-6 |  |  (22.1) | NMP (100) | 4,4'-[(2,5-dihydroxy-p-phenylene)bis(iminocarbonyl-p-phenyleneoxy)]diphthalic anhydride; M.P. above 300° C.; 96%. |
| A-7 | Same as above |  (22.4) | NMP (100) | 4,4'-[(2,5-dihydroxy-p-phenylene)bis(iminocarbonyl-p-phenylenemethylene)]diphthalic anhydride; M.P. above 300° C.; 98%. |
| A-8 | do |  (20.5) | NMP (100) | 4,4'-[(2,5-dihydroxy-p-phenylene)bis(iminocarbonyl-p-phenylenecarbonyl)]diphthalic anhydride; IR ν carbonyl 1,785 cm.⁻¹, 1,855 cm.⁻¹; 98%. |
| A-9 |  |  (44.0) | NMP (100) | 4,4'-[(4,3'-dihydroxy-3,4'-biphenylene) bis(iminocarbonyl)]diphthalic anhydride; IR, ν carbonyl 1,785 cm.⁻¹, 1,855 cm.⁻¹, ν-OH 3,450 cm.⁻¹, ν-NH 3,300 cm.⁻¹, ν amidecarbonyl 1,655 cm.⁻¹; M.P. above 300° C.; C percent (63.83) 63.62, H percent (2.86) 3.04, N percent (4.96) 4.92. |
| A-10 | Same as above | 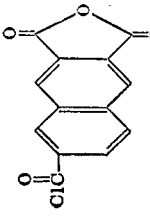 (35.6) | NMP (100) | 6,6'-[(4,3'-dihydroxy-3,4'-biphenylene)bis(iminocarbonyl)]bis[2,3-naphthalenedicarbonyl] anhydride; M.P. above 300° C.; 96 percent. |

TABLE 1—Continued

| Example | Reactants | | | Product (oligomer or monomer adduct) |
|---|---|---|---|---|
| | Diamino-component (g.) | Dianhydride-monoacid-halide (g.) | Reaction medium | IR; elemental analysis (percent); M.P. (° C.); yield (percent) |
| A-11 | do (54.3) | (100) | DMAc | 5,5'-[(4,3'-dihydroxy-3,4'-biphenylylene)bis(iminocarbonyl)]bis[1,4-dihydro-2,3-pyrazine-dicarboxylic anhydride], IR ν carbonyl 1,785, 1,855 cm.⁻¹, ν NH 3,300 cm.⁻¹, ν amide-carbonyl 1,660 cm.⁻¹; μ percent (4.36) 4.33; 96 percent. |
| A-12 | do (32.4) | (100) | NMP | 4,4'-[(4,3'-dihydroxy-3,4'-biphenylylene)bis(iminocarbonyl-p-phenyleneoxy)]diphthalic anhydride; N percent (4.88) 4.92, M.P. above 300° C; 98 percent. |
| A-13 | do (32.7) | (100) | NMP | 4,4'-[(4,3'-dihydroxy-3,4'-biphenylylene)bis(iminocarbonyl-p-phenylenemethylene) diphthalic anhydride; M.P. above 300° C.; 98 percent. |
| A-14 | do (45.8) | (100) | DMAc | 1,1'-[(4,3'-dihydroxy-3,4'-biphenylylene)bis(iminocarbonyl)]bis(3,4-cyclohexene dicarboxylic anhydride; N percent (4.88) 4.92, M.P. above 300° C.; 95%. |
| A-15 | do (31.3) | (100) | NMP | 4,4'[(4,3'-dihydroxy-3,4'-biphenylylene)bis(iminocarbonyl-p-phenylenecarbonyl)]diphthalic anhydride; M.P. above 300° C.; 98%. |
| A-16 | H₂N-C₆H₃(OH)-O-C₆H₃(OH)-NH₂ (47.3) | (100) | NMP | 4,4'-[oxybis[(4-hydroxy-m-phenylene)iminocarbonyl]]diphthalic anhydride; M.P. above 300° C.; 96%. |

TABLE 1—Continued

| Example | Reactants | | | Reaction medium | Product (oligomer or monomer adduct) |
|---|---|---|---|---|---|
| | Diamino-component (g.) | | Dianhydride-monoacid-halide (g.) | | IR; elemental analysis (percent); M.P. (° C.); yield (percent) |
| A-17 | H₂N—⌬(OH)—O—N⌬—OH (39.0) | | ClOC—⌬—O—⌬(anhydride) | DMF (100) | 4,4'-[iminocarbonylbis[(4-hydroxy-m-phenylene)iminocarbonyl-p-phenyleneoxy]]diphthalic anhydride; IR νc=o 1,785, 1,855 cm.⁻¹; N percent (5.16) 5.33; M.P. above 300° C.; 96%. |
| A-18 | H₂N—⌬—C(=O)—⌬(NH₂)(OH) (49.7) | | ClOC—⌬—⌬(anhydride) | NMP (100) | 4,4'-[carbonylbis[(4-hydroxy-m-phenylene)iminocarbonyl]]diphthalic anhydride; M.P. above 300° C.; 97%. |
| A-19 | HO—⌬—NH₂ CH₂ H₂N—⌬—OH (49.3) | | ClOC—⌬—⌬(anhydride) | NMP (100) | 4,4'-[methylenebis[(3-hydroxy-p-phenylene)iminocarbonyl]]diphthalic anhydride; M.P. above 300° C.; 97 percent. |
| A-20 | HO—⌬—NH₂ SO₂ H₂N—⌬—OH (38.5) | | ClOC—⌬—O—⌬(anhydride) | NMP (100) | 4,4'-sulphonebis[(3-hydroxy-p-phenylene)iminocarbonyl-p-phenyleneoxy]diphthalic anhydride; IR νc=o 1,785, 1,855 cm.⁻¹, ν-NH 3,330 cm.⁻¹, ν-OH 3,400 cm.⁻¹, NHCO 1,575 cm.⁻¹, N percent (3.55) 3.61; M.P. above 300° C.; 97%. |
| A-21 | H₂N—⌬(cyclohexyl)—OH (29.3) | | ClOC—⌬—⌬(anhydride) | DMAc (100) | 4,4'-[(2,5-dihydroxy-1,4-cyclohexylene)bis(iminocarbonyl)]diphthalic anhydride; IR Vc=o 1,785, 1,855 cm.⁻¹; M.P. above 300° C.; 96%. |
| A-22 | H₂N—⌬(cyclohexyl)—OH HO—⌬—NH (21.7) | | ClOC—⌬—O—⌬(anhydride) | DMAc (100) | 4,4'-[(2,6-dihydroxy-1,3-cyclohexylene)bis(iminocarbonyl-p-phenyleneoxy)]diphthalic anhydride; M.P. above 300° C.; 95%. |

TABLE 1—Continued

| Example | Reactants | | | Reaction medium | Product (oligomer or monomer adduct) IR; elemental analysis (percent); M.P. (°C.); yield (percent) |
|---|---|---|---|---|---|
| | Diamino-component (g.) | | Dianhydride-monoacid-halide (g.) | | |
| A-23 | H₂N—⟨⟩—NH₂, HO  SH | (37.3) | [phthalic anhydride with ClOC-] | (100) DMAc | 4,4'-[(2,4-dimercapto-m-phenylene)bis(iminocarbonyl)]diphthalic anhydride; IR $\nu_{C=O}$ 1,785, 1,855 cm.⁻¹ $\nu$-NHCO 1,665 cm.⁻¹, $\nu$-NH 3,330 cm.⁻¹, N percent (5.30) 5.34; M.P. above 300°C.; 96%. |
| A-24 | H₂N—⟨⟩—⟨⟩—NH₂, HS  SH | (52.6) | [phthalic anhydride with ClOC-] (cyclohexene) | (100) DMAc | 4,4'-[(3,3'-dimercapto-4,4'-biphenylene)bis(iminocarbonyl)]bis[4-cyclohexene-1,2-dicarboxylic anhydride]; N percent (4.67) 4.58, S percent (10.66) 10.31; M.P. above 300°C; 96%. |
| A-25 | Same as above | (53.5) | [phthalic anhydride with ClOC-] | (100) NMP | 4,4'-[(3,3'-dimercapto-4,4'-biphenylene)bis(iminocarbonyl)]diphthalic anhydride; IR $\nu_{C=O}$ 1,785, 1,855 cm.⁻¹, $\nu$-NH 3,330 cm.⁻¹, $\nu$-NHCO 1,655 cm.⁻¹; C percent (60.90) 59.95, N percent (4.70) 4.65, H (2.72) 2.68, S (10.81) 10.36; M.P. above 300°C.; 95%. |
| A-26 | H₂N—⟨⟩—O—⟨⟩—NH₂, C₂H₅S  SC₂H₅ | (76.3) | Same as above | (100) NMP | 4,4'-[oxybis(4-(ethylthio)-m-phenylene)iminocarbonyl]diphthalic anhydride; IR $\nu_{C=O}$ 1,785, 1,855 cm.⁻¹, $\nu$-NH 3,380 cm.⁻¹, $\nu$-NHCO 1,665 cm.⁻¹; N percent (3.10) 3.18; 95%. |
| A-27 | H₂N—⟨⟩—N(H)—⟨⟩—NH₂, HOOC  COOH | (68.0) | do | (100) DMAc | 4,4'-[iminobis(3-carbonyl-p-phenylene)iminocarbonyl]diphthalic anhydride; IR $\nu_{C=O}$ 1,785 cm.⁻¹, $\nu$-NHCO 1,710 cm.⁻¹, $\nu$-COOH 1,670 cm.⁻¹; N percent (3.40) 3.48; M.P. above 300°C.; 94%. |
| A-28 | H₂N—⟨⟩—⟨⟩—NH₂, CH₃OOC  COOCH₃ | (67.4) | [phthalic anhydride with ClOC-] | (100) DMAc | 4,4'-[(3,3'-bis(methoxycarbonyl)-4,4'-biphenylene)bis(iminocarbonyl)]diphthalic anhydride; N percent (4.70) 4.32; 95%. |

TABLE 1—Continued

| Example | Reactants | | | Reaction medium | Product (oligomer or monomer adduct) IR; elemental analysis (percent); M.P. (° C.); yield (percent) |
|---|---|---|---|---|---|
| | Diamino-component (g.) | | Dianhydride-monoacid-halide (g.) | | |
| A-29 | H₂N—⟨⟩—O—⟨⟩—NH₂ with COOH and HOOC substituents (49.2) | | [structure] (100) | DMAc | 6,6'-[oxybis[(4-carboxy-m-phenylene)iminocarbonyl]]bis[2,3-naphthalene-dicarboxylic anhydride]; IR νc=o 1,855, 1,785 cm.⁻¹, νCOOH 1,710 cm.⁻¹, νNHCO 1,670 cm.⁻¹; N percent 3.80; M.P. above 300° C.; 96%. (3.68) |
| A-30 | H₂N—⟨⟩—⟨⟩—NH₂ with CH₃O and OCH₃ substituents (54.8) | | [structure] (100) | DMAc | 4,4'-[(3,3'-dimethoxy-4,4'-biphenylylene)bis(iminocarbonyl-p-phenyleneoxy)] diphthalic anhydride; IR νc=o 1,785, 1,855 cm.⁻¹, νNH 3,830 cm.⁻¹, νNHCO 1,655 cm.⁻¹; N percent (3.21) 3.28; M.P. above 300° C.; 96. |
| A-31 | H₂N—⟨⟩—NH₂ with NH₂ (30.0) | | [structure] (100) | DMAc | 4,4'-[(4,6-diamino-m-phenylene)bis(iminocarbonyl)]diphthalic anhydride; IR νc=o 1,785, 1,855 cm.⁻¹, νNHCO 1,670 cm.⁻¹, νNH₂ 3,330–3,500 cm.⁻¹; N percent (4.92) 5.00; M.P. above 300° C.; 92%. |
| A-32 | H₂N—⟨⟩—O—⟨⟩—NH₂ with NH₂ (48.6) | | [structure] (100) | DMAc | 4,4'-[oxybis[(4-amino-m-phenylene)iminocarbonyl]]bis[4-cyclohexene-1,2-dicarboxylic anhydride]; IR νc=o 1,785, 1,855 cm.⁻¹, νNHCO 1,670 cm.⁻¹, νNH₂ 3,330–3,500 cm.⁻¹; N percent (4.80) 4.83; M.P. above 300° C.; 94%. |

NOTES:
DMAc = Dimethyl acetamide; NMP = N-methylpyrrolidone; DMF = Dimethyl formamide.
The reaction temperature is −20 to 30° C. for all of these examples, and other conditions are the same as those described in Example A-1.

POLYMERIZATION

Example B-1

A 56.2 g. portion (0.1 mole) of vacuum dried 2,2'-bis(3,4-oxydicarbonylbenzamide)-5,5'-biphenol prepared in Example A-1 is dissolved in 160 ml of N-methylpyrrolidone (solution A). To a nitrogen-blanketed vessel is added an 18.4 g. portion (0.1 mole) of benzidine dissolved in 160 ml. (solution B), and the solution B is cooled with an ice-salt bath at 0° C. with vigorous mechanical stirring. To the solution B is added dropwise the solution A described above through a nitrogen-blanketed dropping funnel at 0° C. over a period of 10 minutes. At the end of addition of diamine, the solution gradually becomes viscous, and the polymerization proceeds smoothly at 0° C. over the period of 30-60 minutes. After removal of the ice-salt bath, the vigorous stirring is continued for another 30 minutes at 25° C. to obtain an extremely viscous polymer solution. A part of the solution is poured onto a glass plate at 80° C. and the solvent is removed at 80° C. for 2 hours at atmospheric pressure to afford a transparent tough film. The film thus obtained is polyamide-acid (I) having an inherent viscosity of 1.17 measured in a 0.5% N-methylpyrrolidone solution at 25.0° C.

*Analysis.*—Calcd. (percent): C, 65.70; H, 3.48; N, 6.97. Found (percent): C, 64.28; H, 3.32; N, 6.82.

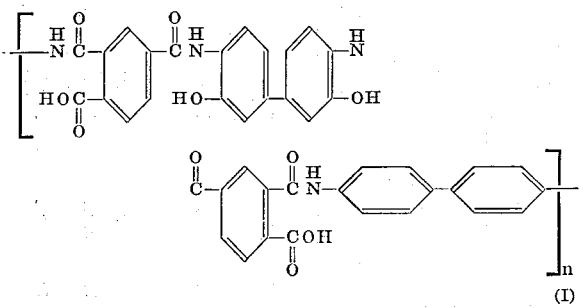

The structure (I) is determined by elemental analyses and infrared spectral analysis.

The polyamide acid film is framed and heated at 300-320° C. for 1 hour. under vacuum at 0.1 mm. Hg to obtain a yellow tough film. The structure (II) of the resultant poly(benzoxazole-imide) is confirmed by elemental analyses and infrared spectrum.

*Analysis.*—Calcd. (percent): C, 65.69; H, 3.68; N, 10.21. Found (percent): C, 65.67; H, 3.64; N, 10.15.

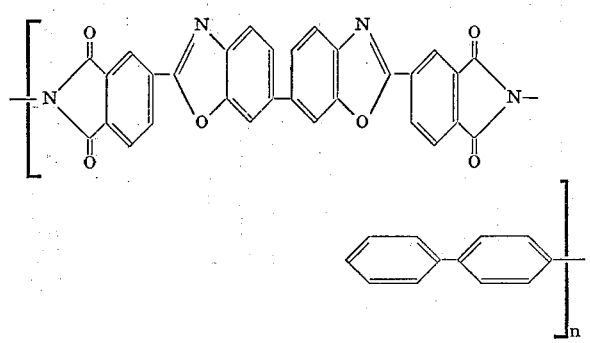

The film thus obtained possesses excellent thermal, electrical and mechanical properties as follows.

THERMAL ENDURANCE AND MECHANICAL PROPERTIES

Thermal stability in air (retention of tensile strength):

250° C. _____ 10 yr. (extrapolated).
275° C. _____ 1 yr.
300° C. _____ 1 mo.

Melting point (° C.): 900° C.
Glass transition temperature (° C.): lower than 500° C.

Tensile strength (kg./cm.$^2$):
25° C. _____ 20
200° C. _____ 20
300° C. _____ 16

Elongation (percent):
25° C. _____ 80
200° C. _____ 100
300° C. _____ 150

Initial modulus (kg./cm.$^2$):
20° C. _____ 322

Moisture region (percent):
40° C. _____ 90% R.H. 24 hrs. 1.6-2.0

Dielectric constant:
3 kc. _____ 4.00

Volume resistivity ohm-cm.:
23° C., 50% R.H. _____ $1.5 \times 10^{12}$

Dielectric strength (k.v./mm.): 75-200

Example B-2

To a 500 cc. blender are put 20.2 g. of 4,4'-diaminodiphenyl ether and 270 g. of N-methyl pyrrolidone. Then, 56.4 g. of 4,4'-(3,3'-dihydroxy-4,4'-biphenylylene)bis(iminocarbonyl) diphthalic anhydride is dispersed into 200 g. of N-methylpyrrolidone and 30 g. of toluene synthesized according to the method of Example A-1 from 4-chloroformyl phthalic anhydride and 3,3'-dihydroxybenzidine. This dispersion is added dropwise to the blender stirred at a high speed. A one-hour reaction gives a viscous polymer solution, which is found by I.R. and elemental analysis to be polyamide having —OH group in the molecule and having a viscosity ($\eta$inh) measured in the same manner as in Example B-1 of 1.25.

This polyamide solution is poured onto a glass plate, put into a dryer, and gradually heated. When it is maintained at 100° C. for 30 minutes, a film is obtained. This film is framed and heated for 1 hour at 280 to 320° C. It is turned into a red transparent film.

The polymer which constitutes this film is poly(benzoxazoleimide). The physical properties of this film are compared with those of the polyimide film prepared in the same manner by using a known pyromellitic acid anhydride instead of the oligomer of this invention as shown below.

TABLE 2

Comparison of the physical properties of poly(benzoxazole-imide) film with those of the polyimide film (the thickness of the film being 16-30μ)

| | Film of poly (benzoxzaole-imide) (present invention) | Polyimide film (conventional film) |
|---|---|---|
| Stability against alkaline hydrolysis (refluxing for 2 hours in a 5% NaOH aqueous solution). | The original form retained. No weight decrease. $\eta$inh. (H$_2$SO$_4$ 0.5%, 25° C.) 1.48 (before treatment), 1.41 (after treatment). | Original form not retained. Completely dissolved and decomposed. $\eta$inh. 1.39 (before treatment), 0.001 (after treatment). |
| Thermal resistance (weight decrease at 600° C. ΔT=6° C./min. by TGA) percent. | 10 | 20. |
| Flexural strength (JIS P-8116). | More than 10$^5$ times | 1-2.7×10$^5$ times. |
| Heat shrinkage at 200° C. percent. | 0.30 | 0.6. |
| Abrasive resistance (Vickers hardness). | 31.0 kg./mm.$^3$ | 24.1 kg./mm.$^2$. |
| Tensile strength (kg./mm.$^2$). | 18-20 | 16-20. |
| Elongation, percent | 60-100 | 60-100. |
| Ratio of strength retention at 20° C., percent. | 85 | 50. |
| Electrical properties (dielectric constant, 3 kc., 22° C.). | 4.00 | 3.62. |

Examples B-3 to B-33

The polymerisation was carred out according to the procedure of Example B-1. The results are shown in Table 3.

TABLE 3

| | Oligomer (g.) | Polyamine (g.) | Medium (ml.) | Temp. (°C.)/time (hr.) | Prepolymer ηinh. | Prepolymer Yield | Final product (M.P., °C.) | Physical properties of film (values in the parentheses are those of the conventional polyimide) |
|---|---|---|---|---|---|---|---|---|
| B-3 | Z-2 (66.2) | 4,4'-diaminodiphenyl (18.4) | NMP (300) | 20/2 | 1.20 | Quantitatively | Poly(benzoxazole-imide) >400 | Thermal resistance: 10% at 600° C., ΔT 6° C./min. (20%). Tenacity: 19–20 kg./mm.², Elongation: 85%. Stability against alkaline hydrolysis (6% NaOH aq. sol., reflux, 2 hrs.): ηinh.=1.48 (before treatment), ηinh.=1.41 (after treatment). Theoretical form retained. (Polyimide is completely dissolved and decomposed without rotation of the original form. ηinh.=1.39 (before treatment) ηinh.=0.00 (after treatment): Tenacity: 19 kg./mm.², Elongation: 85%. |
| B-4 | Z-2 (66.2) | 3,3',4,4'-tetraamino-biphenyl (21.4) | NMP (300) | 15/2 | 1.31 | do | Poly(benzoxazole-imidazopyrrolone) >400 | Flexural strength (JIS P-8116): 1–2.7×10³ (times) (more than 10⁴ times). Tenacity: 18kg./mm.². Elongation: 75%. |
| B-5 | Z-3 (47.2) | 1,2,4-triaminobenzene | DMAc (300) | 15/2 | 1.20 | do | Poly(benzoxazole-imide-imidazopyrrolone) >400 | Heat shrinkage: 0.3% at 250° C. (0.6% at 250° C.). Tenacity:20 kg./mm.². Elongation:85%. |
| B-6 | Z-4 (57.0) | 4,4'-diaminobenzophenone (21.2) | HMPP (300) | 15/2 | 1.41 | do | Poly(benzoxazole-imide) >400 | Abrasive resistance (Vickers hardness): 31.0 kg/mm.² (24.1 kg./mm.²). |
| B-7 | Z-5 (78.9) | 1,2,4,5-tetraaminobenzene (13.8) | NMP (300) | 15/2 | 1.35 | do | Poly(benzoxazole-imidazopyrrolone) >400 | Tenacity: 18–20 kg./mm.² (16–21 kg./mm.²). Elongation: 60–100% (60–100%). |
| B-8 | Z-6 (78.9) | 4,4'-diaminodiphenylether (20.0) | NMP(300) | 15/2 | 0.89 | do | Poly(benzoxazole-imide) >400 | Ratio of tenacity retention: 85% at 200° C. (50%). |
| B-9 | Z-8 (51.8) | 3,4,4'-triaminodiphenylether (21.5) | DMF (300) | 20/1.5 | 1.23 | do | Poly(benzoxazole-imide-imidazopyrrolone) >400 | Electrical properties dielectric constant: 4.00 at 3 kc., 22° C., (3.62). |
| B-10 | Z-9 (59.2) | 4,4'-diaminodiphenylether (20.0) | DMAc (300) | 10/1.5 | 1.15 | do | Poly(benzothiazole-imide) >400 | Moisture regain: 1.60% at 40° C., 90% TH, 24 hr. (1.30–1.60%). |
| B-11 | Z-10 (84.8) | 1,4-diaminobenzene (10.8) | THF (100) plus DMAc (300) | 10/1.5 | 1.20 | do | Poly(benzothiazole-imide) >400 | Abrasive resistance (Vickers hardness) 28 kg/mm.² (24.1 kg./mm.²). |
| B-12 | Z-11 (60.2) | 3,3',4,4'-diaminobenzophenone (24.2) | HMPP (300) | 10/1.5 | 1.50 | do | Poly(benzothiazole-imidazopyrrolone) >400 | Flexural strength: 2.6×10⁵ (times) 1–2.7×10⁵ (times). |
| B-13 | Z-12 (67.1) | 1,2,5,6-tetraaminonaphthalene (18.8) | DMAc (400) | 10/1.5 | 1.70 | do | do >400 | Tensile strength (kg./mm.²) 20.0 (20) at 25° C. 20.0 (14) at 200° C. 16.0 (12) at 300° C. |
| B-14 | Z-13 (80.2) | 1,4-diaminocyclohexane (11.4) | NMP (300) | 10/1.5 | 1.31 | do | do >400 | Initial modulus: 392 kg./mm.² (325 kg./mm.²). |
| B-15 | Z-14 (82.4) | 3,4,4'-triaminodiphenylether (21.5) | DMAc (350) | 30/1.5 | 1.15 | do | Poly(benzoxazinoneimidazopyrrolone-imide) >400 | |
| B-16 | Z-15 (64.6) | 1,2,4-triaminobenzene (12.3) | DMAc (350) | 10/2 | 1.01 | do | do | Intrinsic volumetric resistance: 1.8×10¹² ohm-cm. at 25° C. 7.8×10¹² ohm-cm. at 210° C (2.5×10⁹) (ohm-cm. at 180° C.). |
| B-17 | Z-15 (64.6) | 3,3',4,4'-tetraaminodiphenylether | DMAc (300) | 10/2 | 0.92 | do | Poly(benzoxazinoneimidazopyrrolone) >400 | Elongation: 80% (110%) at 25° C. Abrasive resistance 31.0 kg./mm.² |
| B-18 | Z-16 (73.4) | 1,4-diaminobenzene (10.8) | DMAc (300) | 10/2 | 1.31 | do | Poly(benzoxazinoneimidazoneimide) >400 | Moisture regain: (40° C. 90% RH, 24 hr.) 1.4–1.7 (1.3–1:6). |
| B-19 | Z-17 (65.4) | 1,2,4-triaminobenzene (12.3) | DDMC (350) | 10/2 | 0.91 | do | Poly(benzoxazinoneimide) >400 | Dielectric constant at 3 kc.: 3.9 (3.6). |
| B-20 | Z-19 (54.8) | 1,4-diaminocyclohexane (11.4) | γ-butyrolactone (50) plus DMAc (300) | 10/2 | 1.01 | do | Poly(benzoxazinoneimide) >400 | Heat shrinkage: 0.4% (0.6%) at 250° C. |
| B-21 | Z-20 (77.7) | 4,4'-diaminobiphenyl (18.4) | THF (50) plus NMP (300) | 10/2 | 1.10 | do | do >400 | Tenacity: 22 kg./mm.². Elongation: 69%. Flexural strength: 2.5×10⁵ times (JIS P-8115). |
| B-22 | Z-20 (77.7) | 3,4,4'-diaminodiphenylether (21.5) | NMP (400) | 10/2 | 1.43 | do | Poly(benzoxazoleimidazopyrrolone-imide) >400 | Heat-shrinkage: 0.3% at 250° C. (0.6%). Thermal resistance in air at 600° C. ΔT=6°/min.: 12% (21%). |
| B-23 | Z-20 (77.7) | 1,2,4,5-tetraaminobenzene (13.8) | DMAc (350) | 10/2 | 1.20 | do | Poly(benzoxazoleimidazopyrrolone) >400 | Dielectric constant: 4.00 (22° C., 3 kc.), 3.89 (180° C., 3 kc.), 3.66 (22° C., 3 mc.). Dielectric breakdown voltage: 24 kv./mm. (22° C.), film thickness 40μ. |
| B-24 | Z-21 (62.2) | Methylenebis(4-aminobenzene) (19.8) | NMP (350) | 10/2 | 1.10 | do | do >400 | No weight decrease and viscosity decrease even when boiling for 2 hours in 5% NaOH solution (polyimide completely decomposed). |
| B-25 | Z-23 (51.2) | 3,4,4'-tetraaminodiphenylether (20.0) | DMAc (350) | 20/2 | 0.95 | do | Poly(benzimidazoleimidazopyrrolone) >400 | Tenacity: 21 kg./mm.². Elongation: 94%. Flexural resistance: 2.3×10⁵ times (JIS P-8115). |
| B-26 | Z-25 (74.4) | 4,4'-diaminodiphenyl ether (20.0) | m-cresol (350) | 20/2 | 1.15 | do | Poly(benzimidazoleimide) >400 | Abrasive resistance (Vickers hardness): 31.4 kg./mm.² (24.1 kg./mm.²). |
| B-27 | Z-1 (66.5) plus PMDA (21.8) | 1,4-diaminobenzene (21.6) | DMAc (320) NMP (320) | 20/2 | 1.21 | do | Poly(benzoxazoleimidazopyrrolone) >400 | Very excellent alkaline resistance. No change in form by boiling for 2 hrs. in 5% NaOH aq. sol. Viscosity decrease hardly appreciable (1.39 before treatment, and 1.31 after treatment). (polyimide film completely decomposed under the same conditions). |
| B-28 | Z-2 (66.0) plus PMDA (21.8) | 3,4,4'-triaminodiphenyl ether (35.4) | DMF (320) | 20/2 | 1.35 | do | Poly(benzoxazoleimidazopyrrolone) >400 | Abrasive resistance (Vickers hardness): 31.0 kg./mm.² (24.1 kg./mm.²). |
| B-29 | Z-2 (47.2) plus PMDA (21.8) | 3,3',4,4'-tetraaminodiphenyl (42.8) | DMAc (320) DMF (320) | 20/2 | 1.06 | do | Poly(benzoxazoleimidazopyrrolone) >400 | Dielectric constant: 4.00 (3 kc., 22° C.) tanΔ: 0.002 (3 kc., 22° C.). Dielectric breakdown voltage: 220 kv./mm. (thickness being 20 microns). |
| B-30 | Z-4 (57.0) plus PMDA (21.8) | 4,4'-dimaninodiphenyl (18.4) plus 3,4,3',4'-tetraaminodiphenylether (23.0) | DMSO (320) HMPP (320) | 20/2 | 1.15 | do | Poly(benzoxazoleimidazopyrrolone-imide) >400 | Elongation:72%. Tenacity: 20 kg./mm.². Moisture regain: 1.9%. |

In Table 3, the symbols for the oligomers represent the following:

Z-1: 4,4'-[(2,5-dihydroxy-p-phenylene)bis(iminocarbonyl-p-phenylenemethylene)]diphthalic anhydride Z-2: 4,4'-[(3,3'-dihydroxy-4,4'-biphenylylene)bis(iminocarbonyl)]diphthalic anhydride Z-3: 5,5'-[(4,3'-dihydroxy-3,4'-biphenylylene)bis(iminocarbonyl)]bis[1,4-dihydro-2,3-pyrazinedicarboxylic anhydride]

Z-4: 4,4'-[4,3'-dihydroxy-3,4'-biphenylylene)bis(iminocarbonyl)]bis[4-cyclohexene-1,2-dicarboxylic anhydride]

Z-5: 4,4'-[iminocarbonylbis[(4-hydroxy-m-phenylene)iminocarbonyl-p-phenyleneoxy]]diphthalic anhydride Z-6: 4,4'-[carbonylbis[(3-hydroxy-p-phenylene)iminocarbonyl-p-phenyleneoxy]]diphthalic anhydride Z-7: 4,4'-[(3,3'-dimethoxy-4,4'-biphenylylene)bis(iminocarbonyl)]diphthalic anhydride Z-8: 4,4'-[(2,5-dimercapto-p-phenylene)bis(iminocarbonyl)]diphthalic anhydride Z-9: 4,4'-[(3,3'-dimercapto-4,4'-biphenylylene)bis(iminocarbonyl)]diphthalic anhydride Z-10: 4,4'-[oxybis[[4-(ethylthio)-m-phenylene]iminocarbonyl-p-phenyleneoxy]]diphthalic anhydride Z-11: 4,4'-[(3,3'-dimercapto-4,4'-biphenylylene)bis(iminocarbonyl)] bis[4-cyclohexene-1,2-dicarboxylic anhydride]

Z-12: 4,4'-[(iminobis[(4-mercapto-m-phenylene)iminocarbonyl]bis[4-cyclohexene-1,2-dicarboxylic anhydride]

Z-13: 4,4'-[(3,3'-dicarboxy-4,4'-biphenylylene)bis(iminocarbonyl-p-phenyleneoxy)]diphthalic anhydride Z-14: 4,4'-[carbonylbis[(4-carboxy-m-phenylene)iminocarbonyl-p-phenylenemethylene]]diphthalic anhydride Z-15: 4,4'-[[3,3'-bis(methoxycarbonyl)-4,4'-biphenylylene]bis(iminocarbonyl)]diphthalic anhydride Z-16: 6,6'-[oxybis[(4-carboxy-m-phenylene)iminocarbonyl]]bis(2,3-naphthalenedicarboxylic anhydride]

Z-17: 4,4'-[carbonylbis[(4-carboxy-m-phenylene)iminocarbonyl]]bis[4-cyclohexene-1,2-dicarboxylic anhydride]

Z-18: 4,4'-[carbonylbis[oxy-(4-carboxy-m-phenylene)iminocarbonyl]]bis[4-cyclohexene-1,2-dicarboxylic anhydride]

Z-19: 4,4'-[(4,6-dicarboxy-1,3-cyclohexylene)bis(iminocarbonyl)]diphthalic anhydride Z-20: 4,4'-[(3,3'-dimethoxy-4,4'-biphenylylene)bis(iminocarbonyl-p-phenyleneoxy)]diphthalic anhydride Z-21: 4,4'-[oxybis[(3-methoxy-p-phenylene)iminocarbonyl]]diphthalic anhydride Z-22: 4,4'-[sulphonebis[(3-methoxy-p-phenylene)iminocarbonyl]]diphthalic anhydride Z-23: 4,4'-[(4,6-diamino-m-phenylene)bis(iminocarbonyl)]diphthalic anhydride Z-24: 4,4'-[oxybis[(4-amino-m-phenylene)iminocarbonyl]]bis[4-cyclohexene-1,2-dicarboxylic anhydride]

Z-25: 4,4'-[(3,3'-diamino-4,4'-biphenylylene)bis(iminocarbonyl-p-phenyleneoxy)]diphthalic anhydride Z-26: 4,4'-[(4,6-diamino-1,3-cyclohexylene)bis(iminocarbonyl)]diphthalic anhydride The prepolymer means polyamide having free group X and —COOH in the molecule. The final product means a polymer having formed in the molecule hetero rings by making a solution of the prepolymer into film by dry film-making process, and heat-treating this film at 300 to 350° C. for 5 to 60 minutes to effect the intermolecular ring-closing reaction.

TABLE 3—Continued

| | | | | Prepolymer | | | |
|---|---|---|---|---|---|---|---|
| | Oligomer (g.) | Polyamine (g.) | Medium (ml.) | Temp. (° C.)/time (hr.) | ηinh. | Yield | Final product (M.P., ° C.) | Physical properties of film (values in the parentheses are those of the conventional polyimide) |
| B-31 | Z-5 (78.9) plus PMDA (21.8) | 1,4-diaminobenzene (10.8) plus 1,2,4-triaminobenzene (12.3) | NMP (320) | 20/2 | 1.10 | | do | Flexural strength (JIS P-8115): 2.3×10⁵ (10⁵) times. |
| B-32 | Z-9 (59.2) plus PMDA (21.8) | 4,4'-diaminodiphenyl ether (30.0) plus 3,4,4'-triaminodiphenylether (6.4) plus 3,4,3',4'-tetraaminodiphenylether (5.0) | NMP (520) | 15/2 | 1.05 | do | Poly(benzothiazoleimidazopyrroloeimide)>400. | Thermal resistance: 600° C., N₂ weight decrease 12% (21%). Flexural resistance: (JIS P-8115): 2.6×10⁵ times. |
| B-33 | Z-2 (65.4) plus Z-11 (30.0) | 4,4'-diaminodiphenylether (30.0) | NMP (520) | 15/2 | 1.15 | do | Poly(benzoxazolebenzothiazoleimide)>400. | Initial modulus: 356 kg./mm.², Flexural strength: 3.2×10⁵ (JIS P-8115). Tensile strength:22 kg./mm². |

Note.—NMP=N-methylpyrrolidone; DMAc=Dimethyl acetamide; HMPP=Hexamethylphosphoramide; DMF=Dimethylformamide; THF=Tetrahydrofuran; DMSO=Dimethylsulphoxide.

What is claimed is:
1. A method for the production of a thermally stable film forming polymer which comprises reacting an oligomer of the formula

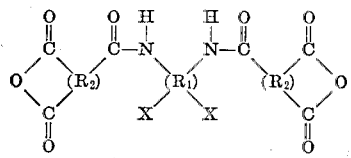

wherein $R_1$ is a group selected from the class consisting of:

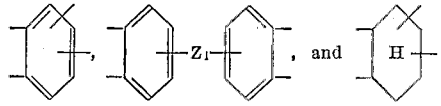

$Z_1$ is a group selected from the class consisting of a carbon-to-carbon bond, alkylene group, —O—, —CO—, —S— and

which directly binds the aromatic nuclei through itself; $R_2$ is a group selected from the class consisting of:

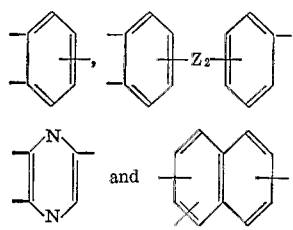

wherein $Z_2$ represents a group selected from the class consisting of a carbon-to-carbon bond, alkylene group, —O—, —S—, which directly binds the aromatic nuclei through itself; and X is a group selected from the class consisting of a hydroxy, alkoxy having 1 to 3 carbon atoms, carboxyl, phenoxy, amino, alkoxycarbonyl having 1 to 3 carbon atoms, phenoxycarbonyl, hydrothio and alkylthio having 1 to 3 carbon atoms at a temperature of from —60° C. to 160° C. with a diamine of the formula $$H_2N—R_3—NH_2$$

wherein $R_3$ in the diamine is a divalent benzenoid group selected from the class consisting of:

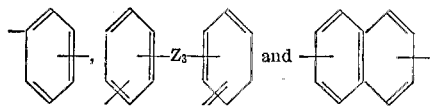

wherein $Z_3$ represents a group seleced from the class consisting of a carbon-to-carbon bond, alkylene group, —O—, —S—, —S— and

which directly binds the aromatic nuclei through itself; and thereafter subjecting the polyamide so formed to a ring closing treatment at a temperature of at least 50° C.

2. A method for the production of a thermally stable film forming polymer which comprises reacting an oligomer of the formula

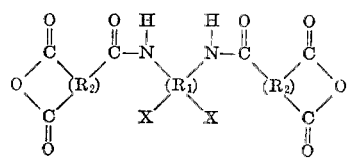

wherein $R_1$ is a group selected from the class consisting of:

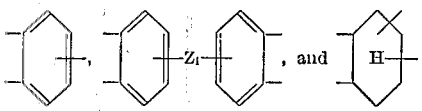

$Z_1$ is a group selected from the class consisting of a carbon-to-carbon bond, alkylene group, —O—, —CO—, —S—, and

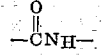

which directly binds the aromatic nuclei through itself; $R_2$ is a group selected from the class consisting of:

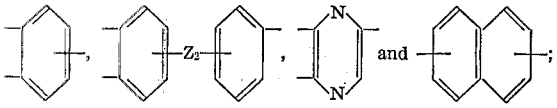

wherein $Z_2$ represents a group selected from the class consisting of a carbon-to-carbon bond, alkylene group, —O—, —S—, which directly binds the aromatic nuclei through itself; and X is a group selected from the class consisting of a hydroxy, alkoxy having 1 to 3 carbon atoms, carboxyl, phenoxy, amino, alkoxycarbonyl having 1 to 3 carbon atoms, phenoxycarbonyl, hydrothio and alkylthio having 1 to 3 carbon atoms at a temperature of from —60° C. to 160° C. with a triamine of the formula

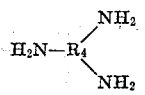

wherein $R_4$ in the triamine is a trivalent benzenoid group selected from the class consisting of:

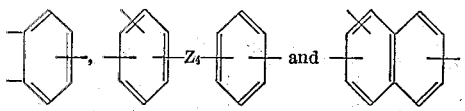

wherein $Z_4$ represents a group selected from the class consisting of a carbon-to-carbon bond, alkylene group, —O—,

—S— and

which directly binds the aromatic nuclei through itself; and thereafter subjecting the polyamide so formed to a ring closing treatment at a temperature of at least 50° C.

3. A method for the production of a thermally stable film forming polymer which comprises reacting an oligomer of the formula

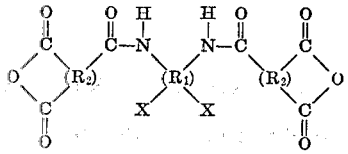

wherein $R_1$ is a group selected from the class consisting of:

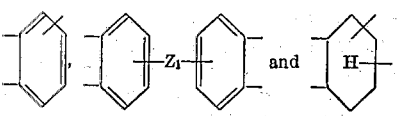

$Z_1$ is a group selected from the class consisting of a carbon-to-carbon bond, alkylene group, —O—, —CO—, —S— and

which directly binds the aromatic nuclei through itself; $R_2$ is a group selected from the class consisting of:

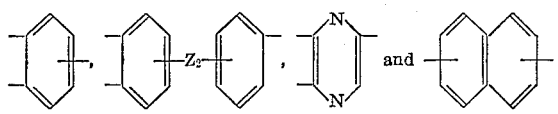

wherein $Z_2$ represents a group selected from the class consisting of a carbon-to-carbon bond, alkylene group, —O—, —S—, which directly binds the aromatic nuclei through itself; and X is a group selected from the class consisting of a hydroxy, alkoxy having 1 to 3 carbon atoms, carboxyl, phenoxy, amino, alkoxycarbonyl having 1 to 3 carbon atoms, phenoxycarbonyl, hydrothio and alkylthio having 1 to 3 carbon atoms at a temperature of from —60° C. to 160° C. with a tetramine of the formula

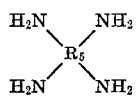

wherein $R_5$ of the tetramine is a tetravalent benzenoid group selected from the class consisting of:

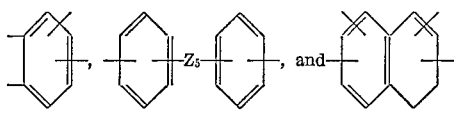

wherein $Z_5$ represents a group selected from the class consisting of a carbon-to-carbon bond, alkylene group,

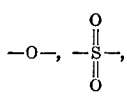

—S— and

which directly binds the nuclei through itself; and thereafter subjecting the polyamide so formed to a ring closing treatment at a temperature of at least 50° C.

4. A method for the production of a thermally stable film forming polymer which comprises reacting an oligomer of the formula

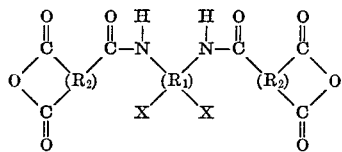

wherein $R_1$ is a group selected from the class consisting of:

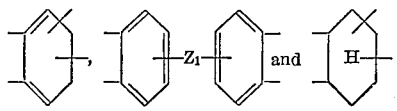

$Z_1$ is a group selected from the class consisting of a carbon-to-carbon bond, alkylene group, —O—, —CO—, —S— and

which directly binds the aromatic nuclei through itself; X is a group selected from the class consisting of a hydroxyl group, alkoxy group, aryloxy group, mercapto group, alkylthio group, arylthio group, carboxyl group, carboxylate group, amino group and halogen; $R_2$ is a group selected from the class consisting of:

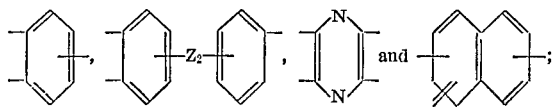

wherein $Z_2$ represents a group selected from the class consisting of a carbon-to-carbon bond, alkylene group, —O—, —S—, which directly binds the aromatic nuclei through itself at a temperature of from —60° C. to 160° C. with a mixture of a diamine of the formula $$H_2N-R_3-NH_2$$

wherein $R_3$ in the diamine is a divalent benzenoid group selected from the class consisting of:

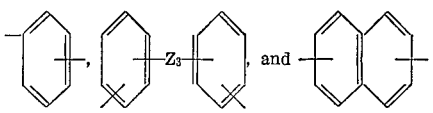

wherein $Z_3$ represents a group selected from the class consisting of a carbon-to-carbon bond, alkylene group,

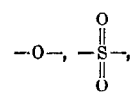

—S—, and

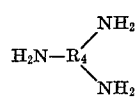

which directly binds the aromatic nuclei through itself, and at least one further polyamine selected from the group consisting of a triamine of the formula

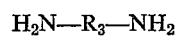

wherein $R_4$ in the triamine is a trivalent benzenoid group selected from the class consisting of:

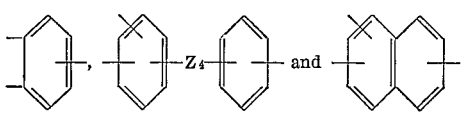

wherein $Z_4$ represents a group selected from the class consisting of a carbon-to-carbon bond, alkylene group, —O—,

—S—, and

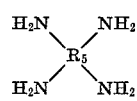

which directly binds the aromatic nuclei through itself; and a tetramine of the formula:

wherein $R_5$ of the tetramine is a tetravalent benzenoid group selected from the class consisting of:

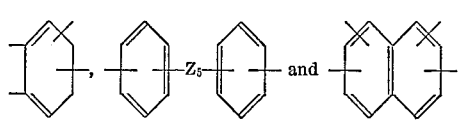

wherein $Z_5$ represents a group selected from the class consisting of a carbon-to-carbon bond, alkylene group, —O—,

—S—, and

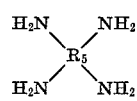

which directly binds the aromatic nuclei through itself, the molar ratio of said diamine to said further polyamine being within the range of 5:95 to 95:5; and thereafter subjecting the polyamide so formed to a ring closing treatment at a temperature of at least 50° C.

5. The method according to claim 1 wherein the reaction is carried out in the presence of a tetracarboxylic acid dianhydride of the formula:

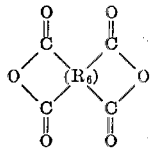

(wherein $R_6$ represents a tetravalent benzenoid group) which replaces not greater than 70 mole percent of the oligomer.

6. The method according to claim 5 wherein the tetracarboxylic acid dianhydride is pyromellitic acid dianhydride.

7. The method according to claim 1 wherein the said reaction is carried out under the temperature condition such that 50% or more by weight of the formed polyamide is not ring-closed at a temperature from −60 to 130° C.

8. The method according to claim 1 wherein the said heat ring-closing treatment is carried out at a temperature in the range of 150 to 400° C.

9. The method according to claim 2 wherein the reaction is carried out in the presence of a tetracarboxylic acid dianhydride of the formula:

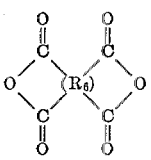

(wherein $R_6$ represents a tetravalent benzenoid group) which replaces not greater than 70 mole percent of the oligomer.

10. The method according to claim 3 wherein the reaction is carried out in the presence of a tetracarboxylic acid dianhydride of the formula:

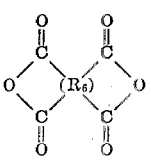

(wherein $R_6$ represents a tetravalent benzenoid group) which replaces not greater than 70 mole percent of the oligomer.

11. The method according to claim 9 wherein the tetracarboxylic acid dianhydride is pyromellitic acid dianhydride.

12. The method according to claim 10 wherein the tetracarboxylic acid dianhydride is pyromellitic acid dianhydride.

13. The method according to claim 2 wherein the said reaction is carried out under the temperature condition such that 50% or more by weight of the formed polyamide is not ring-closed at a temperature from −60° to 130° C.

14. The method according to claim 3 wherein the said reaction is carried out under the temperature condition such that 50% or more by weight of the formed polyamide is not ring-closed at a temperature from −60° to 130° C.

15. The method according to claim 2 wherein the said heat-ring-closing treatment is carried out at a temperature in the range of 150 to 400° C.

16. The method according to claim 3 wherein the said heat ring-closing treatment is carried out at a temperature in the range of 150 to 400° C.

17. The method of claim 1 wherein X is selected from hydroxy, alkoxy having 1 to 3 carbon atoms and phenoxy.

18. The method of claim 2 wherein X is selected from hydroxy, alkoxy having 1 to 3 carbon atoms and phenoxy.

19. The method of claim 3 wherein X is selected from hydroxy, alkoxy having 1 to 3 carbon atoms and phenoxy.

20. The method of claim 1 wherein X is amino.

21. The method of claim 2 wherein X is amino.

22. The method of claim 3 wherein X is amino.

23. The method of claim 1 wherein X is selected from carboxyl, alkoxycarbonyl having 1 to 3 carbon atoms and phenoxycarbonyl.

24. The method of claim 2 wherein X is selected from carboxyl, alkoxycarbonyl having 1 to 3 carbon atoms and phenoxycarbonyl.

25. The method of claim 3 wherein X is selected from carboxyl, alkoxycarbonyl having 1 to 3 carbon atoms and phenoxycarbonyl.

26. The method of claim 1 wherein X is selected from hydrothio and alkylthio having 1 to 3 carbon atoms.

27. The method of claim 2 wherein X is selected from hydrothio and alkylthio having 1 to 3 carbon atoms.

28. The method of claim 3 wherein X is selected from hydrothio and alkylthio having 1 to 3 carbon atoms.

29. A novel thermally stable film forming polymer consisiting essentially of recurring structural units of the formula

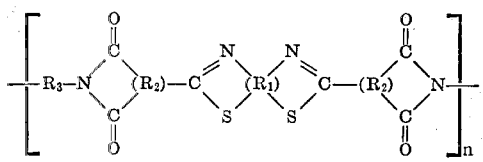

wherein $R_1$ is a group selected from the class consisting of:

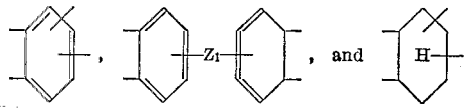

wherein $Z_1$ is a group selected from the class consisting of a carbon-to-carbon bond, alkylene group, —O—, —CO—, —S— and

which directly binds the aromatic nuclei through itself; $R_2$ is a group selected from the class consisting of:

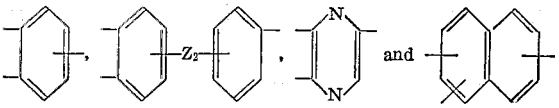

wherein $Z_2$ represents a group selected from the class consisting of a carbon-to-carbon bond, alkylene group, —O—, —S—, which directly binds the aromatic nuclei through itself; $R_3$ is a divalent benenoid group selected from the class consisting of:

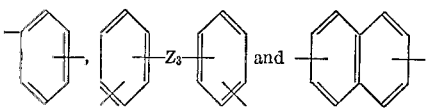

wherein $Z_3$ represents a group selected from the class consisting of a carbon-to-carbon bond, alkylene group,

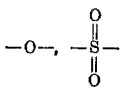

—S— and

which directly binds the aromatic nuclei through itself; and $n$ is an integer.

30. A novel thermally stable film forming polymer consisting essentially of recurring structural units of the formula

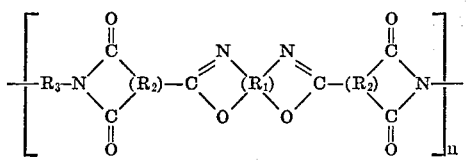

wherein $R_1$, $R_2$, $R_3$, and $n$ are as described in claim 29.

31. A novel thermally stable film forming polymer consisting essentially of recurring structural units of the formula

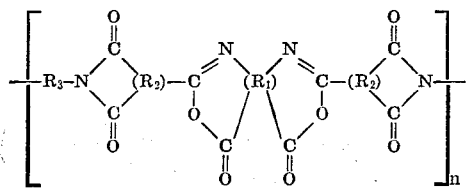

wherein $R_1$, $R_2$, $R_2$, and $n$ are as described in claim 29.

32. A novel thermally stable film forming polymer consisting essentially of recurring structural units of the formula

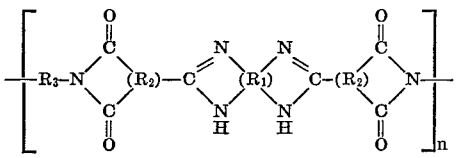

wherein $R_1$, $R_2$, $R_3$, and $n$ are as described in claim 29.

33. A novel thermally stable film forming polymer consisting essentially of recurring structural units of the formula

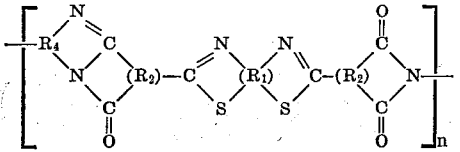

wherein $R_1$, $R_2$ and $n$ are as described in claim 29 and $R_4$ is a trivalent benzenoid group selected from the class consisting of:

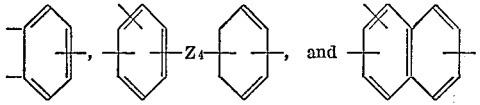

wherein $Z_4$ represents a group selected from the class consisting of a carbon-to-carbon bond, alkylene group,

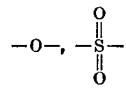

—S— and

which directly binds the aromatic nuclei through itself.

34. A novel thermally stable film forming polymer consisting essentially of recurring structural units of the formula

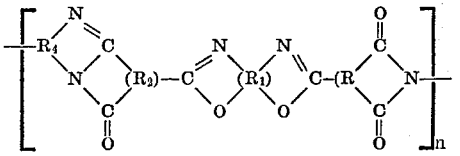

wherein $R_1$, $R_2$, $R_4$ and $n$ are described in class 33.

35. A novel thermally stable film forming polymer consisting essentially of recurring structural units of the formula

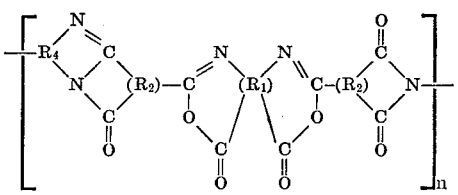

wherein $R_1$, $R_2$, $R_4$ and $n$ are as described in claim 33.

36. A novel thermally stable film forming polymer consisting essentially of recurring structural units of the formula

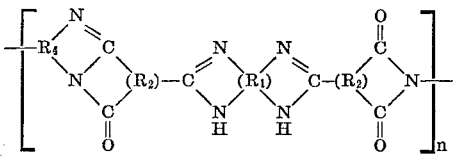

wherein $R_1$, $R_2$, $R_4$, and $n$ are as described in claim 33.

37. A novel thermally stable film forming polymer consisting essentially of recurring structural units of the formula

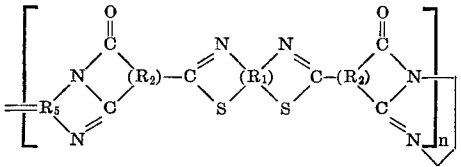

wherein $R_1$, $R_2$, and $n$ are as described in claim 29 and wherein $R_5$ is a tetravalent benzenoid group selected from the class consisting of:

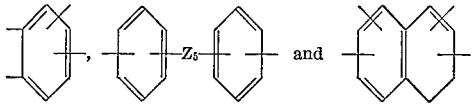

wherein $Z_5$ represents a group selected from the class consisting of a carbon-to-carbon bond, alkylene group, —O—,

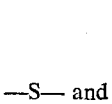

—S— and $$-\overset{O}{\underset{}{\overset{\|}{C}}}NH-$$

which directly binds the aromatic nuclei through itself.

38. A novel thermally stable film forming polymer consisting essentially of recurring structural units of the formula

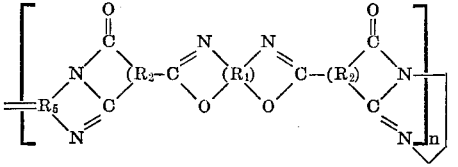

wherein $R_1$, $R_2$, $R_5$, and $n$ are as described in claim 37.

39. A novel thermally stable film forming polymer consisting essentially of recurring structural units of the formula

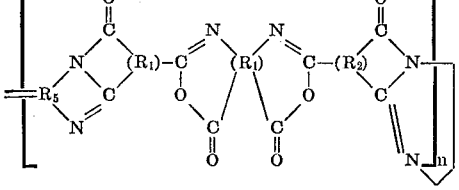

wherein $R_1$, $R_2$, $R_5$ and $n$ are as described in claim 37.

40. A novel thermally stable film forming polymer

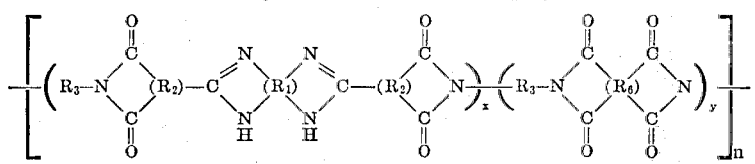

consisting essentially of recurring structural units of the formula

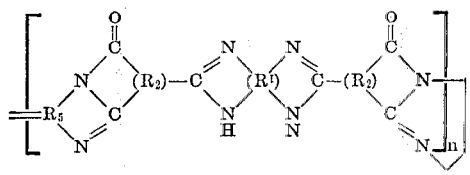

wherein $R_1$, $R_2$, $R_5$ and $n$ are described in claim 37.

41. A novel thermally stable film forming polymer consisting essentially of recurring structural units of the formula

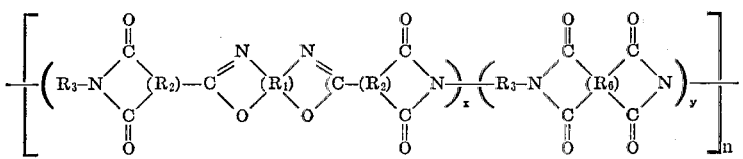

wherein $R_1$, $R_2$, and $R_3$ are as described in claim 29; $R_6$ represents a tetravalent benzenoid group; and $x$, $y$, and $n$ are integers.

42. A novel thermally stable film forming polymer consisting essentially of recurring structural units of the formula

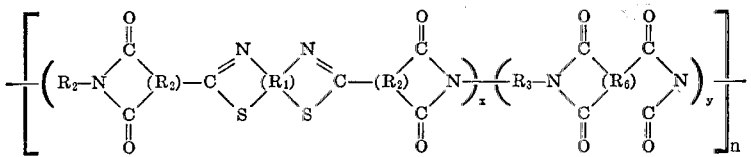

wherein $R_1$, $R_2$, $R_3$, and $R_6$ are as described in claim 41 and $x$, $y$, and $n$ are integers.

43. A novel thermally stable film forming polymer consisting essentially of recurring structural units of the formula

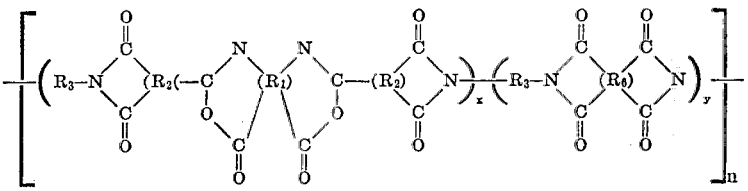

wherein $R_1$, $R_2$, $R_3$ and $R_6$ are as described in claim 41 and $x$, $y$, and $n$ are integers.

44. A novel thermally stable film forming polymer consisting essentially of recurring structural units of the formula wherein $R_1$, $R_2$, $R_3$ and $R_6$ are as described in claim 41 and $x$, $y$, and $n$ are integers.

45. A novel thermally stable film forming polymer consisting essentially of recurring structural units of the formula

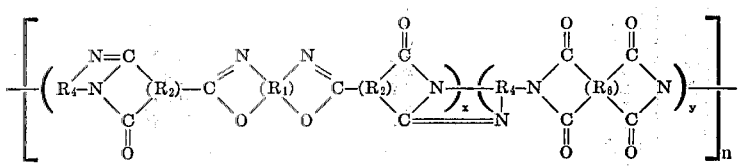

wherein $R_1$, $R_2$, $R_4$, and $R_6$ are as described in claim 9; and $x$, $y$, and $n$ are integers.

46. A novel thermally stable film forming polymer consisting essentially of recurring structural units of the formula

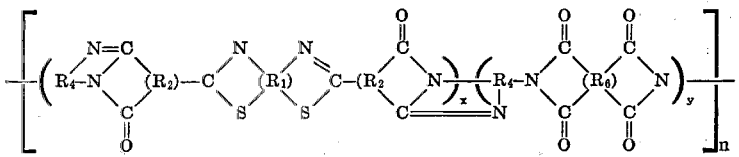

wherein $R_1$, $R_2$, $R_4$, and $R_6$ are as described in claim 9; and $x$, $y$, and $n$ are integers.

47. A novel thermally stable film forming polymer consisting essentialy of recurring structural units of the formula

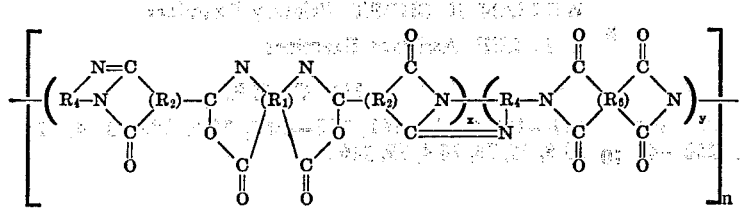

wherein $R_1$, $R_2$, $R_4$, and $R_6$ are as described in claim 9; and $x$, $y$, and $n$ are integers.

48. A novel thermally stable film forming polymer consisting essentially of recurring structural units of the formula

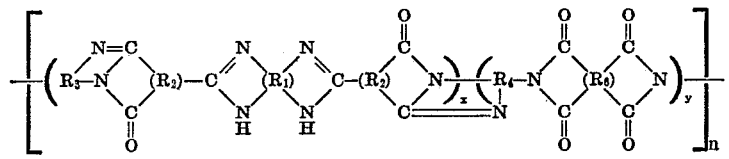

wherein $R_1$, $R_2$, $R_4$, and $R_6$ are as described in claim 9; and $x$, $y$, and $n$ are integers.

49. A novel thermally stable film forming polymer consisting essentially of recurring structural units of the formula

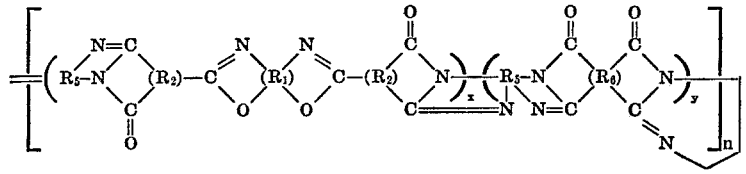

wherein $R_1$, $R_2$, $R_5$, and $R_6$ are as described in claim 10; and $x$, $y$, and $n$ are integers.

50. A novel thermally stable film forming polymer consisting essentially of recurring structural units of the formula

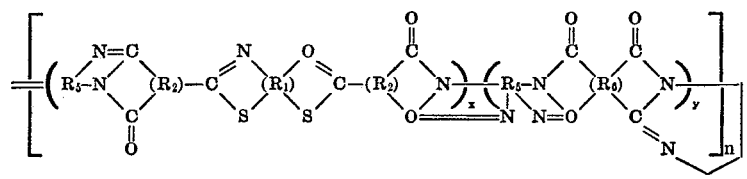

wherein $R_1$, $R_2$, $R_5$, and $R_6$ are as described in claim 10; and $x$, $y$, and $n$ are integers.

51. A novel thermally stable film forming polymer consisting essentially of recurring structural units of the formula

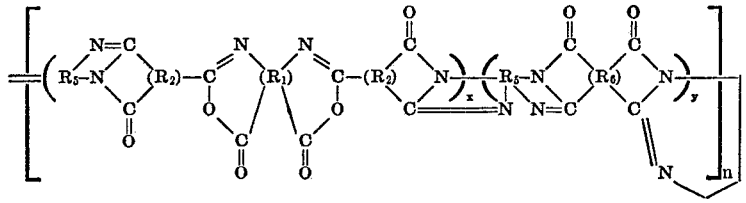

wherein $R_1$, $R_2$, $R_5$, and $R_6$ are as described in claim 10; and $x$, $y$, and $n$ are integers.

52. A novel thermally stable film forming polymer consisting essentially of recurring structural units of the formula

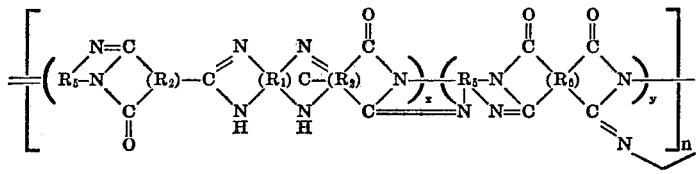

wherein $R_1$, $R_2$, $R_5$, and $R_6$ are as described in claim 10; and $x$, $y$, and $n$ are integers.

53. A novel thermally stable film forming polymer produced by the process of claim 4.

References Cited

UNITED STATES PATENTS

| | | | |
|---|---|---|---|
| 3,179,614 | 4/1965 | Edwards | 260—30.2 |
| 3,414,543 | 12/1968 | Paufler | 260—47 |

FOREIGN PATENTS

| | | | |
|---|---|---|---|
| 29,034 | 12/1965 | Japan | 260—78 |

WILLIAM H. SHORT, Primary Examiner

L. L. LEE, Assistant Examiner

U.S. Cl. X.R.

117—128.4, 132, 161; 260—30.2, 30.6, 30.8, 32.4, 32.6, 33.8, 65, 78, 78.4, 79, 346.3